United States Patent
Tange et al.

(10) Patent No.: US 11,220,576 B2
(45) Date of Patent: Jan. 11, 2022

(54) DEGRADABLE POLYETHYLENE GLYCOL DERIVATIVE HAVING DISULFIDE LINKER

(71) Applicant: NOF CORPORATION, Tokyo (JP)

(72) Inventors: Kota Tange, Kawasaki (JP); Hiroki Yoshioka, Kawasaki (JP); Takuma Tsubusaki, Kawasaki (JP); Masaki Kamiya, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 112 days.

(21) Appl. No.: 16/493,909

(22) PCT Filed: Mar. 23, 2018

(86) PCT No.: PCT/JP2018/011859
§ 371 (c)(1),
(2) Date: Sep. 13, 2019

(87) PCT Pub. No.: WO2018/181048
PCT Pub. Date: Oct. 4, 2018

(65) Prior Publication Data
US 2020/0024391 A1 Jan. 23, 2020

(30) Foreign Application Priority Data
Mar. 30, 2017 (JP) .............................. JP2017-066942

(51) Int. Cl.
*C08G 65/334* (2006.01)
*C08G 65/26* (2006.01)

(52) U.S. Cl.
CPC ....... *C08G 65/334* (2013.01); *C08G 65/2636* (2013.01); *C08G 65/3342* (2013.01)

(58) Field of Classification Search
CPC .............. C08G 65/334; C08G 65/3342; C08G 65/2636; C08G 75/00; C08G 75/14
See application file for complete search history.

(56) References Cited

U.S. PATENT DOCUMENTS

| | | | |
|---|---|---|---|
| 8,309,680 | B2 | 11/2012 | McManus et al. |
| 2005/0014903 | A1 | 1/2005 | Kozlowski et al. |
| 2005/0265925 | A1 | 12/2005 | Zalipsky et al. |
| 2007/0259187 | A1 | 11/2007 | Fukushima et al. |
| 2010/0010158 | A1 | 1/2010 | McManus et al. |
| 2010/0286355 | A1 | 11/2010 | McManus et al. |
| 2011/0034643 | A1 | 2/2011 | Kozlowski et al. |
| 2013/0072709 | A1 | 3/2013 | McManus et al. |
| 2013/0079555 | A1 | 3/2013 | Kozlowski et al. |
| 2013/0331549 | A1 | 12/2013 | McManus et al. |
| 2014/0329990 | A1 | 11/2014 | McManus et al. |
| 2014/0330041 | A1 | 11/2014 | Kozlowski et al. |
| 2015/0094425 | A1 | 4/2015 | Uenishi et al. |
| 2015/0224207 | A1 | 8/2015 | Kozlowski et al. |
| 2016/0083498 | A1 | 3/2016 | Uenishi et al. |

FOREIGN PATENT DOCUMENTS

| | | | | |
|---|---|---|---|---|
| EP | 1 854 553 | A1 | 11/2007 | |
| JP | 2005281845 | A * | 10/2005 | ............. B01J 13/00 |
| JP | 2006-517600 | A | 7/2006 | |
| JP | 2007-303832 | A | 11/2007 | |
| JP | 2007-533750 | A | 11/2007 | |
| JP | 2009-527581 | A | 7/2009 | |
| JP | 2011-500939 | A | 1/2011 | |
| JP | 2013-245254 | A | 12/2013 | |
| WO | 2004/063250 | A1 | 7/2004 | |
| WO | 2007/098466 | A2 | 8/2007 | |
| WO | 2009/055014 | A2 | 4/2009 | |

OTHER PUBLICATIONS

Wang, J. et al.; Analytical Methods, 2011, vol. 3, p. 1745-1751.*
Lee, Y., et al.; Biomacromolecules, 2005, vol. 6, p. 24-26.*
Kalarickal, N.C., et al.; Macromolecules, 2007, vol. 40, p. 1874-1880.*
International Search Report (PCT/ISA/210) dated Jun. 19, 2018 issued by the International Searching Authority in International Application No. PCT/JP2018/011859.
Written Opinion (PCT/ISA/237) dated Jun. 19, 2018 issued by the International Searching Authority in International Application No. PCT/JP2018/011859.
Communication dated Sep. 25, 2020, from the European Patent Office in counterpart European Application No. 18777284.3.
Communication dated Jul. 5, 2021, from the Japanese Patent Office in Application No. 2018-055587.

* cited by examiner

*Primary Examiner* — Robert S Jones, Jr.
(74) *Attorney, Agent, or Firm* — Sughrue Mion, PLLC

(57) ABSTRACT

A degradable polyethylene glycol derivative represented by formula (1). $R^1$, $R^2$, and $R^4$ represent each independently a hydrogen atom or a hydrocarbon group having from 1 to 6 carbon atoms, and at least one of $R^1$, $R^2$, $R^3$ and $R^4$ is the hydrocarbon group; $P^1$ is a straight-chain or branched polyethylene glycol chain having a number of ethylene glycol units of 3 or more; $P^2$ is a straight-chain polyethylene glycol chain having a number of ethylene glycol units of 3 or more; w is an integer of 1 to 8; u is an integer of 1 to 10; $X^1$ is a chemically reactive functional group; and $Z^1$, $Z^2$ and $Z^3$ are each independently a selected divalent spacer.

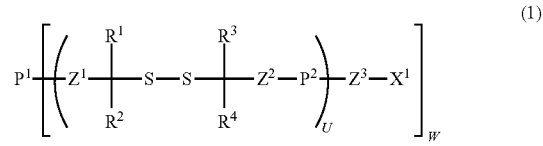

(1)

20 Claims, 2 Drawing Sheets

DEGRADABLE POLYETHYLENE GLYCOL DERIVATIVE HAVING DISULFIDE LINKER

CROSS REFERENCE TO RELATED APPLICATIONS

This application is a National Stage of International Application No. PCT/JP2018/011859 filed Mar. 23, 2018, claiming priority based on Japanese Patent Application No. 2017-066942 filed Mar. 30, 2017.

TECHNICAL FIELD

The present invention relates to a degradable polyethylene glycol derivative in which polyethylene glycol chains are linked by a degradable disulfide linker and which is divided in a living body into a polyethylene glycol chain of low molecular weight which can be more effectively cleared from the living body. The polyethylene glycol derivative described in the specification is used for chemical modification of a biofunctional molecule, for example, a physiologically active protein, a peptide, an antibody, a nucleic acid or a low molecular weight drug, or a drug carrier, for example, a liposome or a polymeric micelle.

BACKGROUND ART

In drug delivery system, the chemical modification of biofunctional molecule or drug carrier with polyethylene glycol, which is a hydrophilic polymer having low antigenicity, is an effective technique for increasing water solubility and bioavailability of the drug or the like and for prolonging circulation time in blood.

On the other hand, after the drug or the like connected to such a polyethylene glycol derivative is transported to the tissue or site as a target to express the efficiency, since the polyethylene glycol having a large molecular weight is insufficient in the clearance from the living body, it remains in the body for a long period of time in some cases.

As to such a problem, an approach has been made in which the polyethylene glycol chains are linked with a degradable linker and the linker is degraded in the living body, thereby dividing the polyethylene glycol chain into a polyethylene glycol chain of low molecular weight which can be more effectively cleared from the living body. Most of the strategies utilize an environment in the living body, for example, pH in the living body or an act of degrading enzyme, for the degradation of the linker, and one of them is a technique of utilizing a reductive environment in a cell.

Under the reductive environment in the living body, for the purpose of dividing the polyethylene glycol chain into a polyethylene glycol chain of low molecular weight, synthesis examples of polyethylene glycol derivative of division type in which the polyethylene glycol chains are linked by a reductively degradable disulfide linker have been reported.

For example, in Patent Literature 1, a plurality of polyethylene glycol derivatives in which two polyethylene glycol chains are connected through a linker containing a disulfide bond are disclosed as shown in chemical formulae below. In Patent Document 1, there is a disclosure that the disulfide bond is degraded in the living body so that the polyethylene glycol chain is divided into two polyethylene glycol chains of low molecular weight. However, evaluation data of degradation rate of the disulfide bond is not shown at all and also, there is no description on the relevance between the structure around the disulfide bond and the degradation rate.

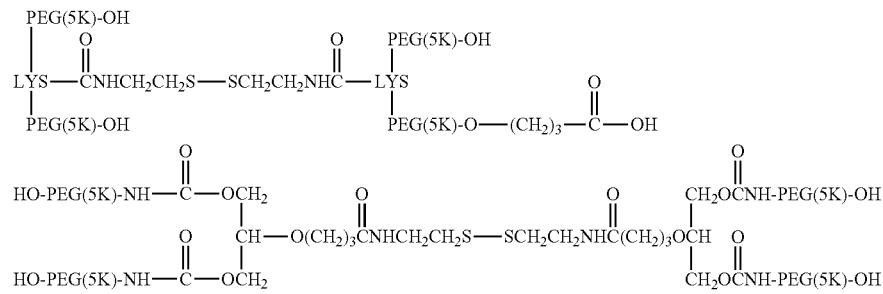

PRIOR ART LITERATURE

Patent Literature

Patent Literature 1: U.S. Pat. No. 8,309,680

SUMMARY OF INVENTION

Problem to be Solved by the Invention

As described above, although there are examples of polyethylene glycol derivatives in which the polyethylene glycol chains are linked by a reductively degradable disulfide linker, there is no example relating to a polyethylene glycol derivative in which the degradation rate of the disulfide linker, that is, the division rate of the polyethylene glycol chain is accurately controlled.

The reductive environment in the living body is controlled by concentration of glutathione which is a tripeptide composed of glutamic acid, cysteine and glycine. The glutathione concentration varies depending on the site in the living body. The glutathione is present at a relatively high concentration of 0.5 to 10 mM in cells, in particular, in liver, kidney, lens, red blood cell or white blood cell. On the other hand, the extracellular concentration of glutathione is from several μM to several tens μM. Since the disulfide bond is reduced by a thiol group of glutathione to be cleaved, the degradation rate of the sulfide bond is greatly affected by the glutathione concentration.

In order to enhance the clearance from the inside of the living body by further imparting degradability while exhibiting conventional advantages due to the polyethylene glycol modification, for example, increase in water solubility and bioavailability and prolongation of circulation time in blood in applications of the chemical modification of biofunctional molecule or drug carrier with polyethylene glycol, it is necessary to accurately control the degradability under these different reductive environments An object of the invention is to provide a degradable polyethylene glycol derivative in which polyethylene glycol chains are linked by a disulfide linker capable of accurately controlling the degradation rate under different reductive environments in the living body, and whose division rate into a polyethylene glycol chain of low molecular weight in the living body is able to be accurately controlled.

Means for Solving the Problem

As a result of the intensive investigations to solve the problem described above, the inventors have developed a degradable polyethylene glycol derivative in which polyethylene glycol chains are linked by a disulfide linker capable of accurately controlling the degradation rate under different reductive environments in the living body, and whose division rate into a polyethylene glycol chain of low molecular weight in the living body is able to be accurately controlled.

The feature of the invention resides in that a plurality of polyethylene glycol chains are connected through a disulfide linker having substituent(s). By appropriately selecting the substituent(s) on the carbon atoms adjacent to the disulfide bond, the degrees of steric hindrance around the disulfide bond which affects the degradation rate of the disulfide linker can be adjusted. Based on the feature, it is possible to impart a desired degradation rate to the disulfide linker, and after the drug or the like connected to the degradable polyethylene glycol derivative is transported to the tissue or cell as a target to express the efficiency, it is possible to divide the polyethylene glycol chain into a polyethylene glycol chain of low molecular weight at an arbitrary rate under the reductive environment in each of these sites.

Thus, the present invention is as follows.

[1] A degradable polyethylene glycol derivative represented by formula (1):

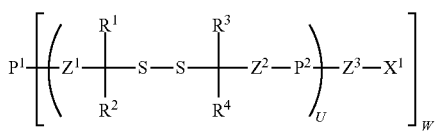

(in formula (1), $R^1$, $R^2$, $R^3$ and $R^4$ represent each independently a hydrogen atom or a hydrocarbon group having from 1 to 6 carbon atoms, and at least one of $R^1$, $R^2$, $R^3$ and $R^4$ is the hydrocarbon group; $P^1$ is a straight-chain or branched polyethylene glycol chain having a number of ethylene glycol units of 3 or more; $P^2$ is a straight-chain polyethylene glycol chain having a number of ethylene glycol units of 3 or more; w is an integer of 1 to 8; u is an integer of 1 to 10; $X^1$ is a chemically reactive functional group; and $Z^1$, $Z^2$ and $Z^3$ are each independently a selected divalent spacer.)

[2] The degradable polyethylene glycol derivative of [1], wherein a sum of number of carbon atoms in $R^1$, $R^2$, $R^3$ and $R^4$ is from 1 to 6.

[3] The degradable polyethylene glycol derivative of [1] or [2], wherein w is 1.

[4] The degradable polyethylene glycol derivative of [3], wherein $P^1$ is a straight-chain polyethylene glycol chain having a hydrocarbon group or a chemically reactive functional group at a terminal thereof.

[5] The degradable polyethylene glycol derivative of [4], wherein $P^1$ is represented by formula (2) shown below:

(in formula (2), $X^2$ is a chemically reactive functional group different from $X^1$ or a methoxy group; $Z^4$ is a divalent spacer; and n is an integer of 3 to 2,000.)

[6] The degradable polyethylene glycol derivative of [1] or [2], wherein w is from 2 to 8.

[7] The degradable polyethylene glycol derivative of [4], wherein $P^1$ is represented by formula (3):

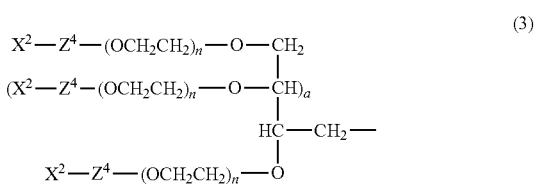

(in formula (3), $X^2$ is a chemically reactive functional group different from $X^1$ or a methoxy group; $Z^4$ is a divalent spacer; n is an integer of 3 to 1,000; and a is 0 or 2.)

[8] The degradable polyethylene glycol derivative of [6], wherein $P^1$ is represented by formula (4):

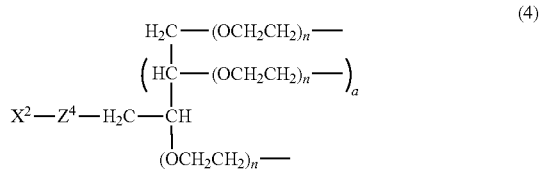

(in formula (4), $X^2$ is a chemically reactive functional group different from $X^1$ or a methoxy group; $Z^4$ is a divalent spacer; n is an integer of 3 to 1,000; and a is 0 or 2.)

[9] The degradable polyethylene glycol derivative of [6], wherein $P^1$ is selected from the group consisting of formula (r), formula (s), formula (t), formula (u) and formula (v):

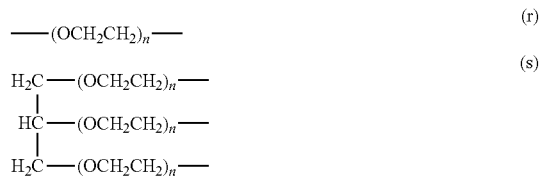

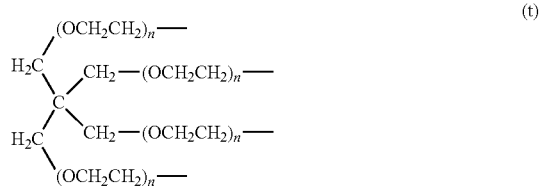

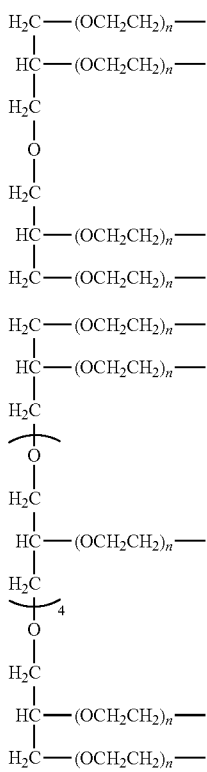

$H_2C—(OCH_2CH_2)_n—$
$HC—(OCH_2CH_2)_n—$
$H_2C$ (u)

(v)

(in formula (r), formula (s), formula (t), formula (u) and formula (v), n is an integer of 3 to 2,000; and w is 2 in a case where $P^1$ is represented by formula (r), w is 3 in a case where $P^1$ is represented by formula (s), w is 4 in a case where $P^1$ is represented by formula (t), w is 4 in a case where $P^1$ is represented by formula (u), and w is 8 in a case where $P^1$ is represented by formula (v).)

[10] The degradable polyethylene glycol derivative of any one of [1] to [9], wherein $P^2$ is represented by formula (5):

$$—(OCH_2CH_2)_m— \quad (5)$$

(in formula (5), m is an integer of 3 to 2,000.)

[11] The degradable polyethylene glycol derivative of any one of [1] to [10], wherein $X^1$ is selected from the group consisting of an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group and an azide group.

[12] The degradable polyethylene glycol derivative of any one of [1] to [11], wherein $Z^1$, $Z^2$ and $Z^3$ are each independently an ether bond, an ester bond, a carbonate bond, a urethane bond, an amide bond, a secondary amino group, an alkylene group containing any of these bonds and group, a single bond or an alkylene group.

[13] The degradable polyethylene glycol derivative of [5], [7] or [8], wherein $X^2$ is selected from the group consisting of an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group, a methoxy group and an azide group.

Effect of the Invention

In the degradable polyethylene glycol derivative having a disulfide linker according to the invention, the degradation rate of the linker can be adjusted under different reductive environments in the living body. Therefore, after the drug or the like connected to the degradable polyethylene glycol derivative is transported to the tissue or cell as a target to express the efficiency, it is possible to divide the polyethylene glycol chain into a polyethylene glycol chain of low molecular weight at an arbitrary rate under the reductive environment in each of these sites. Thus, the problem, which is a disadvantage in conventional polyethylene glycol modification, in that since the polyethylene glycol having a large molecular weight is insufficient in the clearance from the living body, it remains in the body for a long period of time, can be fundamentally eliminated. That is, by using the degradable polyethylene glycol derivative in the chemical modification of the drug or the like, it is able to impart not only the advantages of polyethylene glycol modification, for example, an increase in water solubility and bioavailability and prolongation of circulation time in blood, but also the advantage in that after the drug or the like expresses the efficiency, the clearance of the polyethylene glycol from the living body is excellent.

EMBODIMENTS FOR CARRYING OUT THE INVENTION

Figure 1:
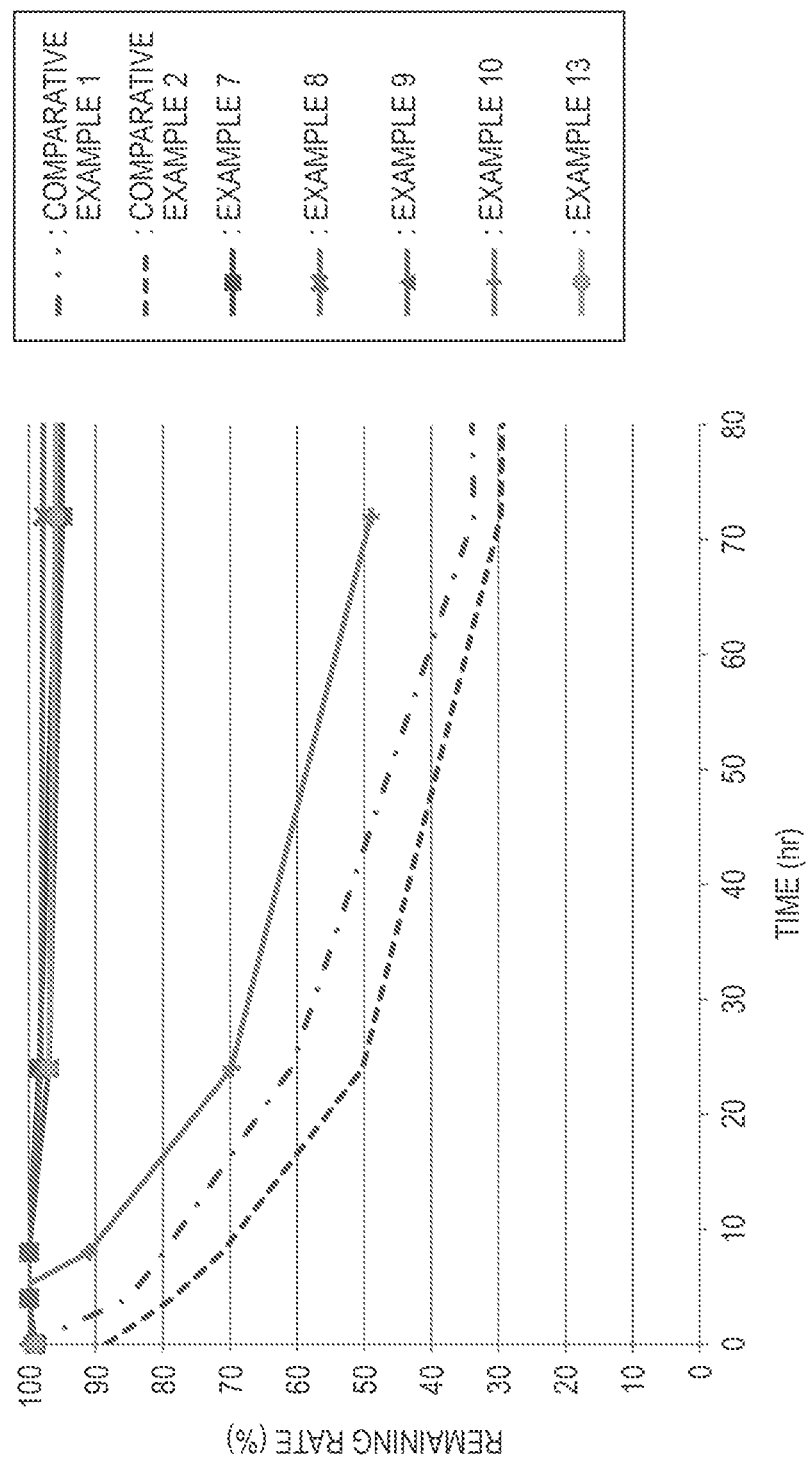
FIG. 1 shows results of the degradability test at glutathione concentration of 10 μM.

The invention will be described in detail hereinafter.

The glutathione includes a reduced type (GSH) and an oxidized type (GSSG) and the oxidized type is a molecule in which two molecules of the reduced-type glutathione is linked by a disulfide bond. In this specification, glutathione refers to the reduced-type glutathione (GSH).

It is preferred that the degradable polyethylene glycol derivative having a disulfide linker according to the invention is stable in blood having a low glutathione concentration and rapidly degraded in a cell having a high glutathione concentration in order to achieve both the prolongation of circulation time in blood when used for chemical modification of a drug or the like and the clearance from the living body.

That is, a degradation half-time ($t_{1/2}$) in a buffer having glutathione concentration of 10 μM at 37° C., which assumes the reductive environment in blood, is one hour or more, preferably 24 hours or more, and more preferably 48 hours or more, and a degradation half-time ($t_{1/2}$) in a buffer having glutathione concentration of 10 mM at 37° C., which assumes the reductive environment in a cell, is within 6 months, more preferably within 3 months, and still more preferably within one month.

In the degradable polyethylene glycol derivative having a disulfide linker according to the invention, the degradation rate can be adequately controlled by controlling the degree of steric hindrance according to selection of the hydrocarbon group introduced into the carbon atoms adjacent to the disulfide bond. It is known that the degree of steric hindrance in the straight-chain hydrocarbon group increases as the number of carbon atoms increases in the order of a methyl group, an ethyl group and a propyl group. It is known that the steric hindrance is larger in a branched hydrocarbon group such as an isopropyl group than in a propyl group.

$R^1$, $R^2$, $R^3$ and $R^4$ in formula (1) of the invention are each independently a hydrogen atom or a hydrocarbon group having from 1 to 6 carbon atoms, provided that $R^1$, $R^2$, $R^3$ and $R^4$ are not all hydrogen atoms. The degree of steric hindrance can be controlled by the selection of the carbon chain length or the presence or absence of branch of each of $R^1$, $R^2$, $R^3$ and $R^4$ or combination of these selections. The hydrocarbon group having from 1 to 6 carbon atoms includes, for example, a methyl group, an ethyl group, a propyl group, an isopropyl group, a butyl group, an isobutyl group, a sec-butyl group, and a tert-butyl group, a pentyl group, an isopentyl group, a neopentyl group, a tert-pentyl group, a 1,2-dimethylpropyl group, a hexyl group, a 2-methylpentyl group, 3-methylpentyl group, 2,2-dimethylbutyl group, a 2,3-dimethylbutyl group and a cyclohexyl group, and is preferably a methyl group, an ethyl group or a propyl group. The sum of number of carbon atoms in $R^1$, $R^2$, $R^3$ and $R^4$ is from 1 to 24, preferably from 1 to 12, and more preferably from 1 to 6.

$X^1$ in formula (1) of the invention is not particularly limited as long as it is a functional group which forms a covalent bond upon a reaction with a functional group present in a biofunctional molecule, for example, a physiologically active protein, a peptide, an antibody, a nucleic acid or a low molecular drug, or a drug carrier, for example, a liposome or a polymeric micelle, which is the object of chemical modification. For example, the functional groups include those described in "Harris, J. M. Poly(Ethylene Glycol) Chemistry; Plenum Press: New York, 1992", "Hermanson, G. T. Bioconjugate Techniques, 2nd ed.; Academic Press: San Diego, Calif., 2008", "PEGylated Protein Drugs: Basic Science and Clinical Applications; Veronese, F. M., Ed.; Birkhauser; Basel, Switzerland, 2009" and the like.

Preferred examples of $X^1$ include an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group and an azide group.

More specifically, the functional group capable of forming a covalent bond upon a reaction with an amino group of the biofunctional molecule is an active ester group, an active carbonate group, an aldehyde group, an isocyanate group, an isothiocyanate group, an epoxy group, a maleimide group, a vinyl sulfone group, an acryl group, a sulfonyloxy group or a carboxy group, the functional group capable of forming a covalent bond upon a reaction with a thiol group of the biofunctional molecule is an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group or a vinyl group, the functional group capable of forming a covalent bond upon a reaction with an aldehyde group or a carboxy group of the biofunctional molecule is a thiol group, an amino group, an oxyamino group or a hydrazide group, the functional group capable of forming a covalent bond upon a reaction with an alkynyl group of the biofunctional molecules is a thiol group, an amino group or an azide group, and the functional group capable of forming a covalent bond upon a reaction with an azide group of the biofunctional molecule is an alkynyl group.

The term "active ester" as referred to herein indicates an activated carboxy group represented by formula: —C(=O)-L, wherein L represents a leaving group.

The leaving group represented by L includes a succinimidyloxy group, a phthalimidyloxy group, a 4-nitrophenoxy group, a 1-imidazolyl group, a pentafluorophenoxy group, a benzotriazol-1-yloxy group, a 7-azabenzotriazol-1-yloxy group and the like. The term "active carbonate" as referred to herein indicates an activated carbonate group represented by formula: —O—C(=O)-L, wherein L represents a leaving group same as described above.

In a preferred embodiment of the invention, $X^1$ is a group represented by group (I), group (II), group (III), group (IV) or group (V).

Group (I): Functional group capable of forming a covalent bond upon a reaction with an amino group of the biofunctional molecule
(a), (b), (b-1), (c), (d), (e) and (f) shown below:

Group (II): Functional group capable of forming a covalent bond upon a reaction with a thiol group of the biofunctional molecule
(a), (b), (b-1), (c), (d), (e), (f), (g), (h), (i) and (j) shown below;

Group (III): Functional group capable of forming a covalent bond upon a reaction with an aldehyde group or a carboxy group of the biofunctional molecule
(g), (k), (l) and (m) shown below;

Group (IV): Functional group capable of forming a covalent bond upon a reaction with an alkynyl group of the biofunctional molecule
(g), (k), (l), (m) and (n) shown below;

Group (V): Functional group capable of forming a covalent bond upon a reaction with an azide group of the biofunctional molecule
(j) shown below;

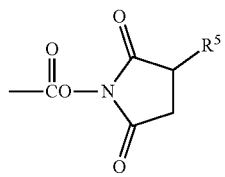
(a)

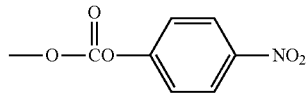
(b)

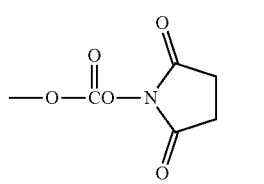
(b-1)

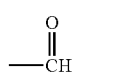
(c)

-continued

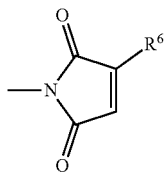
(d)

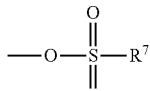
(e)

—COOH (f)

—SH (g)

(h)

(i)

—C≡C—R$^9$ (j)

—NH$_2$ (k)

—O—NH$_2$ (l)

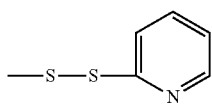
(m)

—N$_3$ (n)

In the formulae above, R$^5$ is a hydrogen atom or a sulfo group, specific examples of the sulfo group include sodium sulfonate and potassium sulfonate, and R$^5$ is preferably a hydrogen atom. R$^6$ and R$^9$ are each a hydrogen atom or a hydrocarbon group having from 1 to 5 carbon atoms, and specific examples of the hydrocarbon group include a methyl group, an ethyl group, a propyl group, an isopropyl group, a butyl group, a tert-butyl group and a pentyl group. R$^7$ is a hydrocarbon group having from 1 to 10 carbon atoms which may contain a halogen atom, specific examples of the hydrocarbon group include a methyl group, an ethyl group, a propyl group, an isopropyl group, a butyl group, a tert-butyl group, a pentyl group, an isopentyl group, a hexyl group, a benzyl group, a 4-methylphenyl group, a trifluoromethyl group, a 2,2,2-trifluoroethyl group, a 4-(trifluoromethoxy)phenyl group, a vinyl group, a chloroethyl group, a bromoethyl group and an iodoethyl group, and R$^7$ is preferably a methyl group, a vinyl group, a 4-methylphenyl group or a 2,2,2-trifluoroethyl group. R$^8$ is a halogen atom selected from the group consisting of a chlorine atom, a bromine atom and an iodine atom.

Z$^1$ and Z$^2$ in formula (1) of the invention are each a divalent spacer between the disulfide linker and the polyethylene glycol chain, and Z$^3$ is a divalent spacer between X$^1$ and the polyethylene glycol chain. These are composed of a covalent bond, are not particularly limited as long as they are more stable than disulfide bond, and are preferably an ether bond, an ester bond, a carbonate bond, a urethane bond, an amide bond, a secondary amino group, an alkylene group containing any of these bonds and group, a single bond or an alkylene group. The number of carbon atoms of the alkylene group is preferably from 1 to 24. By way of illustration and without limitation, preferred examples of the alkylene group include structures such as (z1). Preferred examples of the alkylene group having an ether bond include structures such as (z2) or (z3). Preferred examples of the alkylene group having an ester bond include structures such as (z4). Preferred examples of the alkylene group having a carbonate bond include structures such as (z5). Preferred examples of the alkylene group having a urethane bond include structures such as (z6). Preferred examples of the alkylene group having an amide bond include structures such as (z7). Preferred examples of the alkylene group having a secondary amino group include structures such as (z8). In a preferred embodiment, p and q are each independently an integer of 1 to 12. However, in the case where at least one of Z$^1$, Z$^2$ and Z$^3$ is an ether bond, an ester bond, a carbonate bond, a urethane bond, an amide bond, a secondary amino group or an alkylene group containing any of these bonds and group and a plurality of identical structural units are connected, a number of the structural units described above is 2 or less.

—(CH$_2$)$_p$— (z1)

—O(CH$_2$)$_p$— (z2)

—(CH$_2$)$_p$—O—(CH$_2$)$_q$— (z3)

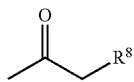
(z4)

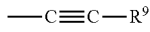
(z5)

(z6)

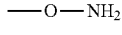
(z7)

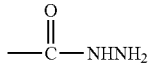
(z8)

P$^1$ in formula (1) of the invention is a straight-chain or branched polyethylene glycol chain having a number of ethylene glycol units of 3 or more, and P$^2$ is a straight-chain polyethylene glycol chain having a number of ethylene glycol units of 3 or more. The number of the ethylene glycol units constituting P$^1$ or P$^2$ is more preferably 10 or more, and particularly preferably 20 or more. Further, the number of the ethylene glycol units constituting P$^1$ or P$^2$ is more preferably 2,000 or less, and particularly preferably 1,000 or less.

The term "polyethylene glycol" as used in the specification means both of polyethylene glycol having a molecular weight distribution obtained by polymerization of ethylene oxide and a monodispersed polyethylene glycol obtained by connecting an oligoethylene glycol having a single molecular weight by a coupling reaction.

In one aspect of the invention, the degradable polyethylene glycol derivative in which w in formula (1) is 1 is provided.

In a preferred embodiment of the aspect, $P^1$ in formula (1) is a straight-chain polyethylene glycol chain having a methoxy group or a chemically reactive functional group at the terminal thereof.

Specific examples of the straight-chain polyethylene glycol chain having a chemically reactive functional group or a methoxy group for $P^1$ include those represented by formula (2).

$$X^2-Z^4-(OCH_2CH_2)_n- \quad (2)$$

In formula (2), n is a number of repeating units per polyethylene glycol chain, and in the polyethylene glycol chain having a molecular weight distribution, it is defined that n is calculated by various theoretical calculations based on a number average molecular weight (Mn) of the compound.

In formula (2), $X^2$ is a chemically reactive functional group different from $X^1$ or a methoxy group, and $Z^4$ is a divalent spacer between the functional group $X^2$ and the polyethylene glycol chain. Since the degradable polyethylene glycol derivative has two different chemically reactive functional groups $X^1$ and $X^2$, it is possible to provide a polyethylene glycol-drug conjugate having a target-directing performance, for example, by connecting a drug to $X^1$ and connecting a biofunctional molecule having a target-directing property to $X^2$.

Preferred examples of $X^2$ include an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group, an azide group and a methoxy group.

More specifically, the functional group capable of forming a covalent bond upon a reaction with an amino group of the biofunctional molecule is an active ester group, an active carbonate group, an aldehyde group, an isocyanate group, an isothiocyanate group, an epoxy group, a maleimide group, a vinyl sulfone group, an acryl group, a sulfonyloxy group or a carboxy group, the functional group capable of forming a covalent bond upon a reaction with a thiol group of the biofunctional molecule is an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group or a vinyl group, the functional group capable of forming a covalent bond upon a reaction with an aldehyde group or a carboxy group of the biofunctional molecule is a thiol group, an amino group, an oxyamino group or a hydrazide group, the functional group capable of forming a covalent bond upon a reaction with an alkynyl group of the biofunctional molecule is a thiol group or an azide group, and the functional group capable of forming a covalent bond upon a reaction with an azide group of the biofunctional molecule is an alkynyl group.

In a preferred embodiment of the invention, $X^2$ is a group represented by group (I), group (II), group (III), group (IV) or group (V).

Group (I): Functional group capable of forming a covalent bond upon a reaction with an amino group of the biofunctional molecule (a), (b), (b-1), (c), (d), (e) and (f) shown below;

Group (II): Functional group capable of forming a covalent bond upon a reaction with a thiol group of the biofunctional molecule (a), (b), (b-1), (c), (d), (e), (f), (g), (h), (i) and (j) shown below;

Group (III): Functional group capable of forming a covalent bond upon a reaction with an aldehyde group or a carboxy group of the biofunctional molecule (g), (k), (l) and (m) shown below;

Group (IV): Functional group capable of forming a covalent bond upon a reaction with an alkynyl group of the biofunctional molecule (g), (k), (l), (m) and (n) shown below;

Group (V): Functional group capable of forming a covalent bond upon a reaction with an azide group of the biofunctional molecule (j) shown below;

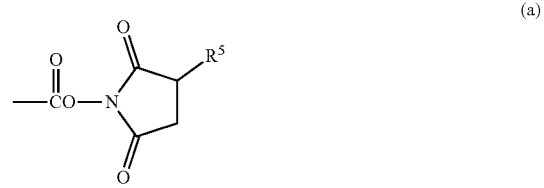

(a)

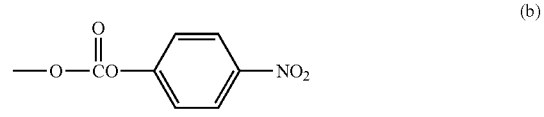

(b)

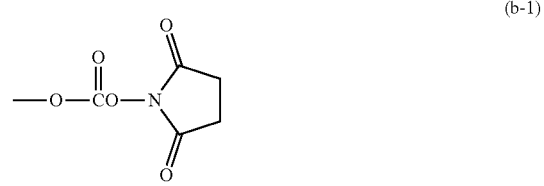

(b-1)

(c)

(d)

(e)

—COOH (f)

—SH (g)

(h)

(i)

-continued

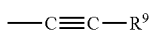 (j)

 (k)

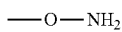 (l)

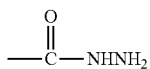 (m)

 (n)

In the formulae above, $R^5$ is a hydrogen atom or a sulfo group, specific examples of the sulfo group include sodium sulfonate and potassium sulfonate, and $R^5$ is preferably a hydrogen atom. $R^6$ and $R^9$ are each a hydrogen atom or a hydrocarbon group having from 1 to 5 carbon atoms, and specific examples of the hydrocarbon group include a methyl group, an ethyl group, a propyl group, an isopropyl group, a butyl group, a tert-butyl group and a pentyl group. $R^7$ is a hydrocarbon group having from 1 to 10 carbon atoms which may contain a halogen atom, specific examples of the hydrocarbon group include a methyl group, an ethyl group, a propyl group, an isopropyl group, a butyl group, a tert-butyl group, a pentyl group, an isopentyl group, a hexyl group, a benzyl group, a 4-methylphenyl group, a trifluoromethyl group, a 2,2,2-trifluoroethyl group, a 4-(trifluoromethoxy)phenyl group, a vinyl group, a chloroethyl group, a bromoethyl group and an iodoethyl group, and $R^7$ is preferably a methyl group, a vinyl group, a 4-methylphenyl group or a 2,2,2-trifluoroethyl group. $R^8$ is a halogen atom selected from the group consisting of a chlorine atom, a bromine atom and an iodine atom.

It is necessary that $X^2$ is different from $X^1$. As to preferred examples of a combination of $X^1$ and $X^2$, when $X^1$ is an active ester group or an active carbonate group, $X^2$ is a group selected from a maleimide group, a vinyl sulfone group, an α-haloacetyl group, an alkynyl group and an azide group; when $X^1$ is an aldehyde group, $X^2$ is a group selected from a maleimide group, a vinyl sulfone group, an alkynyl group and an azide group; when $X^1$ is a maleimide group, a vinyl sulfone group or an α-haloacetyl group, $X^2$ is a group selected from an active ester group, an active carbonate group, an alkynyl group and an azide group; when $X^1$ is an alkynyl group or an azide group, $X^2$ is a group selected from a maleimide group, a vinyl sulfone group, an α-haloacetyl group, an active ester group, an active carbonate group, an amino group and an oxyamino group; when $X^1$ is an amino group or an oxyamino group, $X^2$ is a group selected from an alkynyl group, an azide group, a thiol group or a carboxy group; and when $X^1$ is a thiol group. $X^2$ is a group selected from an amino group, an oxyamino group, an azide group and a carboxy group.

More preferably, when $X^1$ is an active ester group or an active carbonate group, $X^2$ is a group selected from a maleimide group, an α-haloacetyl group, an alkynyl group and an azide group; when $X^1$ is an aldehyde group, $X^2$ is a group selected from a maleimide group, an α-haloacetyl group, an alkynyl group and an azide group; when $X^1$ is a maleimide group or an α-haloacetyl group, $X^2$ is a group selected from an active ester group, an active carbonate group, an alkynyl group and an azide group; when $X^1$ is an alkynyl group or an azide group, $X^2$ is a group selected from a maleimide group, an α-haloacetyl group, an active ester group, an active carbonate group, an amino group and an oxyamino group; when $X^1$ is an amino group or an oxyamino group, $X^1$ is a group selected from an alkynyl group, an azide group and a thiol group; and when $X^1$ is a thiol group, $X^2$ is a group selected from an amino group, an oxyamino group and an azide group.

$Z^4$ is composed of a covalent bond, is not particularly limited as long as it is more stable than the disulfide bond, and is preferably an ether bond, an ester bond, a carbonate bond, a urethane bond, an amide bond, a secondary amino group, an alkylene group containing any of these bonds and group, a single bond or an alkylene group. The number of carbon atoms of the alkylene group is preferably from 1 to 24. By way of illustration and without limitation, preferred examples of the alkylene group include structures such as (z1) shown below. Preferred examples of the alkylene group having an ether bond include structures such as (z2) or (z3) shown below. Preferred examples of the alkylene group having an ester bond include structures such as (z4) shown below.

Preferred examples of the alkylene group having a carbonate bond include structures such as (z5) shown below. Preferred examples of the alkylene group having a urethane bond include structures such as (z6) shown below. Preferred examples of the alkylene group having an amide bond include structures such as (z7) shown below. Preferred examples of the alkylene group having a secondary amino group include structures such as (z8) shown below. In a preferred embodiment, p and q are each independently an integer of 1 to 12. However, in the case where $Z^3$ is an ether bond, an ester bond, a carbonate bond, a urethane bond, an amide bond, a secondary amino group or an alkylene group containing any of these bonds and group and a plurality of identical structural units are connected, a number of the structural units described above is 2 or less.

 (z1)

 (z2)

 (z3)

 (z4)

 (z5)

 (z6)

 (z7)

 (z8)

In another preferred embodiment of the aspect, $P^1$ in formula (1) is a branched polyethylene glycol chain having a methoxy group or a chemically reactive functional group at the terminal thereof.

Specific examples of the branched polyethylene glycol having a methoxy group or a chemically reactive functional group at the terminal thereof for $P^1$ include those represented by formula (3).

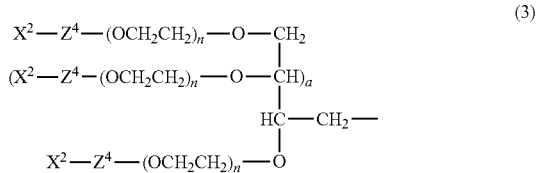
(3)

In the formula, a is 0 or 2, $X^2$ is a chemically reactive functional group different from $X^1$ or a methoxy group, and $Z^4$ is a divalent spacer between the functional group $X^2$ and the polyethylene glycol chain.

In the case where a is 0, two polyethylene glycol chains are present, and in the case where a is 2, four polyethylene glycol chains are present. In general, in the chemical modification of a bio-related substance with polyethylene glycol, when connecting points to the polyethylene glycol are introduced more than necessary, the active sites of the bio-related substance are destroyed to reduce its function so that an attempt to increase the effect by increasing a molecular weight of the polyethylene glycol has been performed. However, the viscosity increases with the increase in the molecular weight and hence, for example, handling as an aqueous solution preparation, for example, an injection preparation becomes difficult. Since the polyethylene glycol derivative has a branched structure, it shows low viscosity in comparison with a straight-chain polyethylene glycol derivative having the same molecular weight, and thus it is useful in application, for example, the aqueous solution preparation.

The polyethylene glycol derivative in which $P^1$ is represented by formula (3) has one $X^1$ and two or four $X^2$ and, for example, when a drug is connected to $X^1$ and a biofunctional molecule having a target-directing property is connected to $X^2$, a drug conjugate having a high target-directing performance can be provided.

In another aspect of the invention, the degradable polyethylene glycol derivative in which w in formula (1) is from 2 to 8 is provided.

In a preferred embodiment of the aspect, $P^1$ in formula (1) is represented by formula (4).

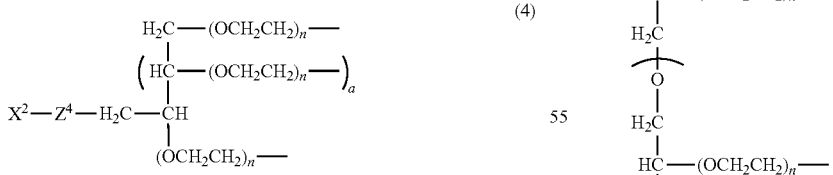
(4)

In the formula, $X^2$ is the chemically reactive functional group different from $X^1$ as described above, $Z^4$ is the divalent spacer as described above, and a is 0 or 2.

In the antibody-drug conjugate (ADC)-related field, in order to increase drug transportation efficiency, it is preferred to connect a plurality of drugs to an antibody, but when a plurality of connecting points are introduced into the antibody, a problem arises in that the affinity to an antigen is decreased. The polyethylene glycol derivative in which $P^1$ is represented by formula (4) has two or four $X^1$ and one $X^2$ and, for example, when an anticancer agent is connected to $X^1$ and an antibody is connected to $X^2$ in ADC targeting cancer, it is possible to improve the transportation efficiency of the anticancer agent without increasing the connecting points to the antibody.

In another preferred embodiment of the aspect, $P^1$ in formula (1) is polyethylene glycol chain having the number of terminals of 2 to 8, all the terminals of the polyethylene glycol chain constituting $P^1$ are each connected to $Z^1$, and w is equal to the number of terminals of the polyethylene glycol chain.

In specific examples of the embodiment, $P^1$ in formula (1) is selected from the group consisting of formula (r), formula (s), formula (t), formula (u) and formula (v), w is 2 in the case where $P^1$ is represented by formula (r), w is 3 in the case where $P^1$ is represented by formula (s), w is 4 in the case where $P^1$ is represented by formula (t), w is 4 in the case where $P^1$ is represented by formula (u), and w is 8 in the case where $P^1$ is represented by formula (v).

(r)

(s)

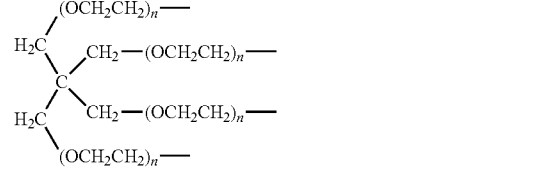
(t)

(u)

(v)

A preferred range of n in formula (2) or formula (r) of the invention is an integer of 3 to 2,000, more preferably an integer of 20 to 1,000, and still more preferably an integer of 40 to 500. Further, a preferred range of n in formula (3), formula (4), formula (s), formula (t), formula (u) or formula (v) is preferably an integer of 3 to 1,000, more preferably an integer of 10 to 500, and still more preferably an integer of 20 to 250.

In one aspect of the invention, $P^2$ in formula (1) is represented by formula (5).

$$—(OCH_2CH_2)_m— \quad (5)$$

In the formula, m is a number of repeating units per polyethylene glycol chain, and in a polyethylene glycol chain having a molecular weight distribution, it is defined that m is calculated by various theoretical calculations based on a number average molecular weight (Mn) of the compound.

A preferred range of m in formula (5) of the invention is an integer of 3 to 2,000, more preferably an integer of 20 to 1,000, and still more preferably an integer of 40 to 500. Further, a preferred range of m in formula (5) is preferably an integer of 3 to 1,000, more preferably an integer of 10 to 500, and still more preferably an integer of 20 to 250.

In formula (1) of the invention, u is a number of combinations of the disulfide linker and the structural unit composed of $P^2$ connected in series. A preferred range of u is an integer of 1 to 10, more preferably an integer of 1 to 5, and still more preferably an integer of 1 or 2.

The degradable polyethylene glycol derivative of the invention can be synthesized by linking a polyethylene glycol intermediate composed of $P^2$ to a polyethylene glycol intermediate composed of $P^1$ through a disulfide linker having substituent(s). The bond generated by the linking is determined by a combination of the functional groups used in the reaction, and is the ether bond, the ester bond, the carbonate bond, the urethane bond, the amide bond, the secondary amino group, the alkylene group containing any of these bonds and group, the single bond or the alkylene group contained in the divalent spacers $Z^1$ and $Z^2$ described above.

In the degradable polyethylene glycol derivative synthesized, the terminal functional group is chemically converted, if desired. As to the reaction used for the functional group conversion, a conventionally known method can be used, but it is necessary to appropriately select conditions which do not decompose the disulfide group in formula (1) and the bonds contained in the divalent spacers $Z^1$, $Z^2$, $Z^3$ and $Z^4$ described above. In addition, in the synthesis of the degradable polyethylene glycol derivative, the disulfide linker compound for introducing the disulfide linker either may be connected to the polyethylene glycol intermediate composed of $P^1$ and then connected to the polyethylene glycol intermediate composed of $P^2$ or may be connected to the polyethylene glycol intermediate composed of $P^2$ and then connected to the polyethylene glycol intermediate composed of $P^1$. As a typical example of the synthesis of the degradable polyethylene glycol derivative, the steps described below are exemplified.

Disulfide Linker Compound

The polyethylene glycol derivative having a disulfide bond of the invention is obtained by coupling corresponding polyethylene glycol derivatives having a thiol group to each other or by appropriately derivatizing from a linker having a disulfide bond. A method of appropriately derivatizing from a disulfide linker is described here, but the invention is not limited thereto.

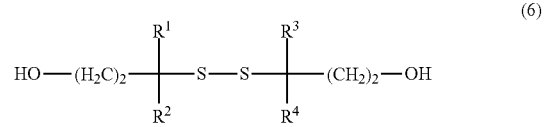

(in the formula, $R^1$, $R^2$, $R^3$ and $R^4$ are each independently a hydrogen atom or a hydrocarbon group having from 1 to 6 carbon atoms, provided that $R^1$, $R^2$, $R^3$ and $R^4$ are not all hydrogen atoms.)

The sulfide linker of formula (6) is obtained by coupling a compound having a hydroxy group which is a chemically reactive functional group and a thiol group represented by formula (7) shown below in a protic solvent, for example, water, methanol or ethanol, in an aprotic solvent, for example, acetonitrile, tetrahydrofuran, dimethyl sulfoxide, dimethylformamide or dimethylacetamide, or without any solvent by using iodine, hydrogen peroxide solution or the like.

The compound of formula (6) in which a combination of $R^1$ and $R^2$ is different from a combination of $R^3$ and $R^4$ can be obtained by coupling two compounds of formula (7) in which a combination of $R^1$ and $R^2$ is different from each other, or protecting the thiol group in a compound of formula (7) by methoxycarbonylsulfenyl chloride or the like and then coupling with another compound of formula (7) in which a combination of $R^1$ and $R^2$ is different from the combination in the former. The compound obtained may be purified by a purification means, for example, extraction, recrystallization, adsorbent treatment, reprecipitation, column chromatography or supercritical extraction.

(in the formula, $R^1$ and $R^2$ are each independently a hydrogen atom or a hydrocarbon group having from 1 to 6 carbon atoms, provided that $R^1$ and $R^2$ are not all hydrogen atoms.)

The hydroxy groups of the compound of formula (6) are allowed to react with di(N-succinimidyl) carbonate in an aprotic solvent, for example, toluene, benzene, xylene, acetonitrile, ethyl acetate, diethyl ether, tert-butyl methyl ether, tetrahydrofuran, chloroform, dichloromethane, dimethyl sulfoxide, dimethylformamide or dimethylacetamide or without any solvent in the presence of an organic base, for example, pyridine, triethylamine, N-methylmorpholine, potassium tert-butoxide or sodium hexamethyldisilazane or an inorganic base, for example, potassium carbonate, potassium hydroxide or sodium hydride to obtain a compound of formula (8). The ratio of organic base or inorganic base used is not particularly limited and is preferably equimolar or more with respect to the chemically reactive functional group of the compound of formula (6). Further, the organic base may be used as a solvent. The compound obtained may be purified by the purification means described above.

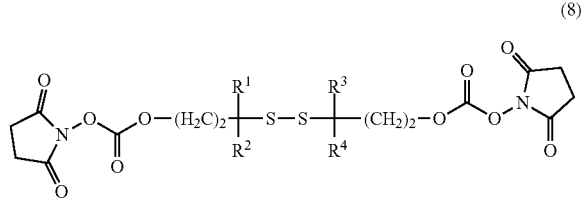

(8)

As the chemically reactive functional group in the compound of formula (6), a functional group other than the hydroxy group can also be used. Specific examples thereof include a hydroxyalkyl group, an amino group, an aminoalkyl group, a carboxy group and a carboxyalkyl group. Further, the functional group described above may be protected by a protective group which can be deprotected under reaction conditions where the disulfide group is not decomposed. Examples of the protective group can be found in many general books and are described, for example, in "Wuts, P. G M.; Greene, T. W., Protective Groups in Organic Synthesis, 4th ed.; Wiley-Interscience: New York, 2007". Moreover, the functional group protected by the protective group can reproduce the original functional group by deprotection using reaction conditions suitable for each of the protective groups, that is, causing a chemical reaction. Therefore, in the specification, a functional group which is protected by a protective group and is capable of being deprotected by various reactions is included in the "chemically reactive functional group". The kinds and the typical deprotection conditions of the specific protective groups are described in the literature described above, and the reaction conditions suitable for each of the protective groups are selected and the deprotection can be performed before the reaction with the hydrophilic polymer intermediate.

(B) Polyethylene Glycol Intermediate Composed of $P^1$

Ethylene oxide is polymerized in an amount of 3 to 2,000 molar equivalents with respect to methanol, which is an initiator, in toluene or without any solvent under alkaline conditions, for example, metallic sodium, metallic potassium, sodium hydride or potassium hydride to obtain polyethylene glycol of formula (9). The initiator is preferably an alcohol having a hydrocarbon group having from 1 to 24 carbon atoms, and specifically includes, for example, methanol, ethanol, propanol, isopropanol, butanol, tert-butanol, phenol and benzyl alcohol. Since the polyethylene glycol has a hydroxy group which is a chemically reactive functional group, it can be used as it is in a reaction with a disulfide linker compound.

(9)

The hydroxy group of the polyethylene glycol of formula (9) is subjected to functional group conversion by a known method to obtain a polyethylene glycol intermediate of formula (10). The compound obtained may be purified by a purification means, for example, extraction, recrystallization, adsorbent treatment, reprecipitation, column chromatography or supercritical extraction.

(10)

As the chemically reactive functional group in the polyethylene glycol intermediate of formula (10), other functional groups can also be used. Preferred examples of the chemically reactive functional group are functional groups wherein the bond generated by the reaction between the polyethylene glycol intermediate and the disulfide linker compound becomes the ether bond, the ester bond, the carbonate bond, the urethane bond, the amide bond, the secondary amino group, the alkylene group containing any of these bonds and group, the single bond or the alkylene group contained in the divalent spacer $Z^1$ of formula (1), and specifically include, for example, a halogen atom, an active ester, an active carbonate, an aldehyde group, an amino group, a hydroxy group and a carboxy group.

(C) Reaction Between Disulfide Linker Compound and Polyethylene Glycol Intermediate Composed of $P^1$ The disulfide linker compound of formula (8) and the polyethylene glycol intermediate of formula (10) are subjected to a reaction in an aprotic solvent, for example, toluene, benzene, xylene, acetonitrile, ethyl acetate, diethyl ether, tert-butyl methyl ether, tetrahydrofuran, chloroform, dichloromethane, dimethyl sulfoxide, dimethylformamide or dimethylacetamide to obtain a compound of formula (11) or a compound of formula (12). On this occasion, the compound of formula (12) is efficiently obtained by using equimolar or more of the polyethylene glycol intermediate of formula (10) with respect to the chemically reactive functional group of the disulfide linker compound of formula (8), and the formation rate of the compound of formula (12) is increased by using the disulfide linker compound of formula (8) in an excessive amount with respect to the polyethylene glycol intermediate of formula (10). In order to efficiently obtain the compound of formula (12), an equivalent ratio of the disulfide linker compound of formula (8) with respect to the polyethylene glycol intermediate of formula (10) is preferably twice or more, more preferably 10 times or more, and still more preferably 100 times or more.

The compound obtained may be purified by the purification means described above.

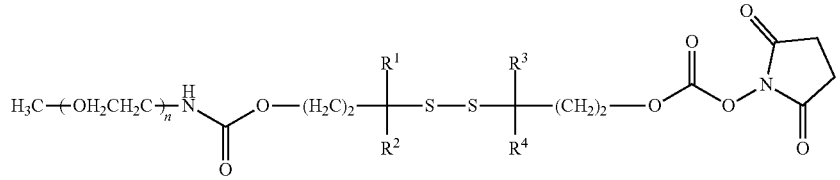

(11)

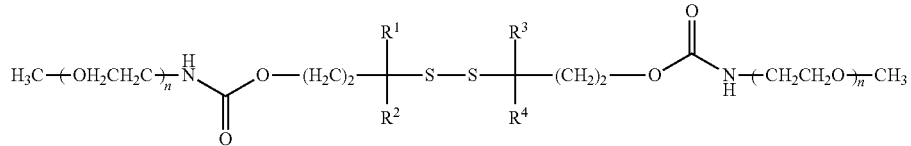

(12)

(D) Polyethylene Glycol Intermediate Composed of $P^2$

The polyethylene glycol intermediate composed of $P^2$ has chemically reactive functional groups at at least two terminals of polyethylene glycol, and preferred examples of the chemically reactive functional group include an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group, an azide group and a hydroxy group.

More specifically, the functional group capable of forming a covalent bond upon a reaction with an amino group of the disulfide linker is an active ester group, an active carbonate group, an aldehyde group, an isocyanate group, an isothiocyanate group, an epoxy group, a maleimide group, a vinyl sulfone group, an acryl group, a sulfonyloxy group or a carboxy group, the functional group capable of forming a covalent bond upon a reaction with a thiol group of the disulfide linker is an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group or a vinyl group, the functional group capable of forming a covalent bond upon a reaction with an aldehyde group or a carboxy group of the disulfide linker is a thiol group, an amino group, an oxyamino group, a hydrazide group or a hydroxy group, the functional group capable of forming a covalent bond upon a reaction with an alkynyl group of the disulfide linker is a thiol group or an azide group, and the functional group capable of forming a covalent bond upon a reaction with an azide group of the disulfide linker is an alkynyl group.

The chemically reactive functional groups in the polyethylene glycol intermediate composed of $P^2$ may be the same or different, and a combination of two different functional groups is preferred.

As to preferred examples of the combination of two different functional groups, when one is an active ester group or an active carbonate group, the other is a group selected from a maleimide group, a vinyl sulfone group, an α-haloacetyl group, an alkynyl group and an azide group, when one is an aldehyde group, the other is a group selected from a maleimide group, a vinyl sulfone group, an alkynyl group and an azide group, when one is a maleimide group, a vinyl sulfone group or an α-haloacetyl group, the other is a group selected from an active ester group, an active carbonate group, an alkynyl group and an azide group, when one is an alkynyl group or an azide group, the other is a group selected from a maleimide group, a vinyl sulfone group, an α-haloacetyl group, an active ester group, an active carbonate group, an amino group, an oxyamino group and a hydroxy group, when one is an amino group or an oxyamino group, the other is an alkynyl group, an azide group, a thiol group, a hydroxy group or a carboxy group, and when one is a thiol group or a hydroxy group, the other is a group selected from an amino group, an oxyamino group, an azide group and a carboxy group. More preferably, when one is an active ester group or an active carbonate group, the other is a group selected from a maleimide group, an α-haloacetyl group, an alkynyl group and an azide group, when one is an aldehyde group, the other is a group selected from a maleimide group, an α-haloacetyl group, an alkynyl group and an azide group, when one is a maleimide group or an α-haloacetyl group, the other is a group selected from an active ester group, an active carbonate group, an alkynyl group and an azide group, when one is an alkynyl group or an azide group, the other is a group selected from a maleimide group, an α-haloacetyl group, an active ester group, an active carbonate group, an amino group, an oxyamino group and a hydroxy group, when one is an amino group or an oxyamino group, the other is a group selected from an alkynyl group, an azide group, a hydroxy group and a thiol group, and when one is a thiol group or a hydroxy group, the other is a group selected from an amino group, an oxyamino group and an azide group.

Further, of the chemically reactive functional groups in the polyethylene glycol intermediate composed of $P^2$, the functional group other than the functional groups reacted with the disulfide linker may be protected with a protective group which is stable under the reaction conditions of the reaction with the disulfide linker. The typical deprotection conditions of the protective group are described in the literature described above, and the reaction conditions suitable for each of the protective groups are selected. However, in the case where the chemically reactive functional group is a functional group which does not inhibit the reaction with the disulfide linker even when it is not protected by a protective group, it is not necessary to use a protective group.

The description will be made here using the compound of formula (13) having an amino group protected with a tert-butoxycarbonyl group (Boc group) at one terminal of a straight-chain polyethylene glycol and an amino group at the other terminal thereof. Preferred examples of the polyethylene glycol having the combination of two different functional groups are described, for example, in NOF Corporation (Tokyo, Japan; see www.nof.co.jp/english: Catalogue Ver. 15), but it is not limited thereto.

$$\text{H}_2\text{N}\text{--}(\text{CH}_2\text{CH}_2\text{O})_n\text{--}(\text{CH}_2)_3\text{--NH-Boc} \quad (13)$$

(E) Reaction Between Polyethylene Glycol Intermediate Composed of $P^1$ having Disulfide Linker and Polyethylene Glycol Intermediate Composed of $P^2$ The disulfide linker compound of formula (11) is allowed to react with the polyethylene glycol intermediate of formula (13) in an aprotic solvent, for example, toluene, benzene, xylene, acetonitrile, ethyl acetate, diethyl ether, tert-butyl methyl ether, tetrahydrofuran, chloroform, dichloromethane, dimethyl sulfoxide, dimethylformamide or dimethylacetamide to obtain a compound of formula (14). The ratio used is preferably the disulfide linker compound of formula (11) and the polyethylene glycol intermediate of formula (13).

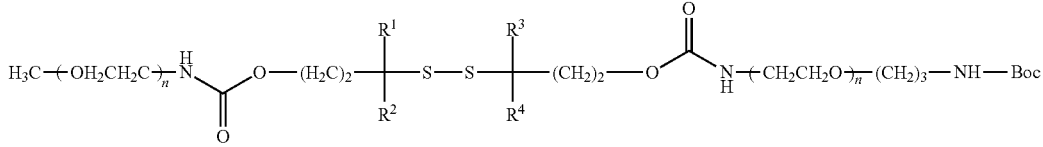

(14)

The reaction conditions of the reaction between the polyethylene glycol intermediate composed of $P^1$ and the polyethylene glycol intermediate composed of $P^2$ are determined depending on the combination of the chemically reactive functional group of the polyethylene glycol intermediate composed of $P^1$ and the chemically reactive functional group of the polyethylene glycol intermediate composed of $P^2$ and a conventionally known method can be used. However, it is necessary to appropriately select conditions which do not decompose the bonds contained in the disulfide group and the divalent spacers $Z^1$, $Z^2$ and $Z^3$ described above of formula (1)

The compound thus-obtained may be purified by a purification means, for example, extraction, recrystallization, adsorbent treatment, reprecipitation, column chromatography or supercritical extraction.

(F) Terminal Functional Group Conversion of Degradable Polyethylene Glycol Derivative having Disulfide Linker The compound of formula (14) is treated by using an acid catalyst in a protic solvent, for example, methanol or ethanol or an aprotic solvent, for example, acetonitrile, tetrahydrofuran, dimethyl sulfoxide, dimethylformamide or dimethylacetamide to obtain a compound of formula (14-1) in which the tert-butoxycarbonyl group is deprotected and converted into an amino group. The acid catalyst may be any of an organic acid and an inorganic acid, and is not particularly limited. Specific examples thereof include p-toluenesulfonic acid, pyridinium p-toluenesulfonate and methanesulfonic acid. The ratio of the acidic compound used is not particularly limited and is preferably equimolar or more with respect to the chemically reactive functional group of the Compound of formula (14). The compound obtained may be purified by the purification means described above.

deuterated solvent, and tetramethylsilane (TMS) was used as an internal standard substance.

Comparative Example 1

To a 100 ml three-necked flask equipped with a thermometer, a nitrogen inlet tube and a stirrer were added 1.00 g of a compound of formula (15), 5.0 g of dichloromethane, 31 mg of iodine and 28 mg of sodium carbonate, and the mixture was stirred at room temperature for one hour. Thereto were added 5 g of an aqueous 0.01 M sodium thiosulfate solution and 5 g of methanol, followed by stirring, and it was visually confirmed that the color of iodine disappeared and became colorless. Further, 5 g of ion-exchange water was added thereto, the mixture was stirred and allowed to stand, and then the lower layer was desolvated by an evaporator. The concentrate was dissolved in 5 g of ethyl acetate, 10 g of hexane was added to the solution to deposit crystals, and then the crystals were collected by filtration to obtain a compound of formula (16).

n = about 113

n = about 113

$^1$H-NMR (CDCl$_3$, internal standard TMS); δ (ppm):
2.89 (4H, t, —C$\underline{H}_2$—S—S—C$\underline{H}_2$—),
3.38 (6H, s, C$\underline{H}_3$O—)
3.52-4.25 (904H, m, —(OC$\underline{H}_2$C$\underline{H}_2$)$_n$—O—)

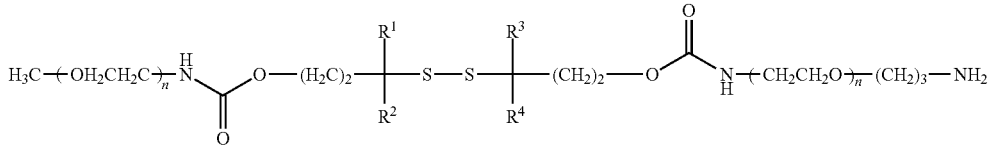

(14-1)

Furthermore, the amino group of the compound of formula (14-1) may be subjected to functional group conversion by a known method. The compound obtained may be purified by the purification means described above.

EXAMPLES

The invention will be described more specifically with reference to the examples, but the invention should not be construed as being limited thereto.

In $^1$H-NMR analysis, JNM-ECP400 or JNM-ECA600 produced by JEOL DATUM Ltd. was used. For the measurement, a tube of 5 mm ϕ was used, CDCl$_3$ was used as a Comparative Example 2

To a 100 ml three-necked flask equipped with a thermometer, a nitrogen inlet tube and a stirrer were added 5.63 mg of cystamine dihydrochloride, 5 g of methanol, 6.07 mg of triethylamine and 1.0 g of a compound of formula (17), and the mixture was stirred at room temperature for one hour. Then, the mixture was desolvated by an evaporator, after crystallization using 6 g of ethyl acetate and 3 g of hexane were performed three times, the crystals were washed with 10 g of hexane and dried to obtain a compound of formula (18).

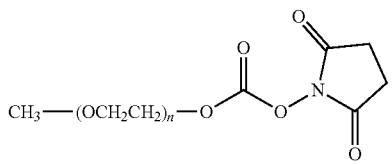

(17)

n = about 113

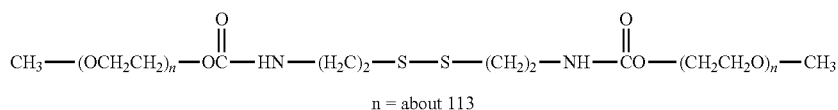

(18)

n = about 113

¹H-NMR (CDCl₃, internal standard TMS); δ (ppm):
2.89 (4H, t, —C$\underline{H}_2$—S—S—C$\underline{H}_2$—),
3.38 (6H, s, C$\underline{H}_3$O—)
3.52-4.25 (904H, m, —(OC$\underline{H}_2$C$\underline{H}_2$)$_n$—O—)

Example 1

To a 100 ml three-necked flask equipped with a thermometer, a nitrogen inlet tube and a stirrer were added 4.00 g of 3-mercapto-3-methyl-1-butanol, 40.0 g of methanol and 1.76 g of sodium carbonate, and then 5.08 g of iodine was added dividedly in a small amount with stirring. After stirring at room temperature for one hour, analysis was performed by TLC (chloroform/methanol=9/1 v/v, iodine coloration) and the disappearance of the raw material spots was confirmed.

An aqueous 0.1 M sodium thiosulfate solution was prepared and 100 g thereof was added to the reaction solution, followed by stirring, and it was visually confirmed that the color of iodine disappeared and became colorless. Thereto added 100 g of chloroform, the mixture was stirred and then allowed to stand to separate layers, and the upper layer was removed. The lower layer was washed twice with 100 g of ion-exchange water and desolvated by an evaporator. To the concentrate was added 100 g of ethanol to perform azeotropic dehydration twice, and then nitrogen bubbling was performed to obtain a compound of formula (19).

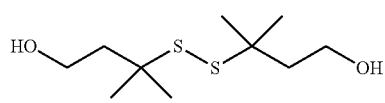

(19)

¹H-NMR (CDCl₃, internal standard TMS); δ (ppm):
1.25 (12H, s, (C$\underline{H}_3$)₂C<),
1.78 (4H, t, OH—CH₂—C$\underline{H}_2$—),
3.67 (4H, t, OH—C$\underline{H}_2$—)

Example 2

To a 100 ml three-necked flask equipped with a thermometer, a nitrogen inlet tube and a stirrer were added 3.00 g of 3-mercapto-1-hexanol, 30.0 g of methanol and 1.18 g of sodium carbonate, and then 3.39 g of iodine was added dividedly in a small amount with stirring. After stirring at room temperature for one hour, analysis was performed by TLC (chloroform/methanol=9/1 v/v, iodine coloration) and the disappearance of the raw material spots was confirmed.

An aqueous 0.1 M sodium thiosulfate solution was prepared and 100 g thereof was added to the reaction solution, followed by stirring, and it was visually confirmed that the color of iodine disappeared and became colorless. Thereto added 100 g of chloroform, the mixture was stirred and then allowed to stand to separate layers, and the upper layer was removed. The lower layer was washed twice with 100 g of ion-exchange water and desolvated by an evaporator. To the concentrate was added 100 g of ethanol to perform azeotropic dehydration twice, and then nitrogen bubbling was performed to obtain a compound of formula (20).

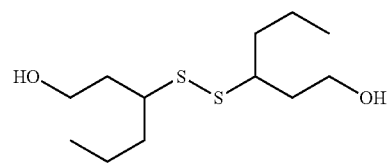

(20)

¹H-NMR (CDCl₃, internal standard TMS); δ (ppm):
0.901 (6H, s, C$\underline{H}_3$—CH₂—), 1.35-1.69 (8H, m, CH₃—C$\underline{H}_2$—CH₂—),
1.78 (4H, t, OH—CH₂-C$\underline{H}_2$—), 2.81 (2H, m, —S—C$\underline{H}$<),
3.67 (4H, t, OH—C$\underline{H}_2$—)

Example 3

To a 100 ml three-necked flask equipped with a thermometer, a nitrogen inlet tube and a stirrer were added 0.50 g of 3-mercapto-2-butanol, 0.38 g of 3-mercapto-1-propanol, 10.0 g of methanol and 0.50 g of sodium carbonate, and then 1.43 g of iodine was added dividedly in a small amount with stirring. After stirring at room temperature for one hour, analysis was performed by TLC (chloroform/methanol=9/1 v/v, iodine coloration) and the disappearance of the raw material spots was confirmed.

An aqueous 0.1 M sodium thiosulfate solution was prepared and 100 g thereof was added to the reaction solution, followed by stirring, and it was visually confirmed that the color of iodine disappeared and became colorless. Thereto added 100 g of chloroform, the mixture was stirred and then allowed to stand to separate layers, and the upper layer was removed. The lower layer was washed twice with 100 g of ion-exchange water and desolvated by an evaporator. To the concentrate was added 100 g of ethanol to perform azeotropic dehydration twice, and then nitrogen bubbling was performed. The concentrate was separated and purified by silica gel column chromatography to obtain a compound of formula (21).

(21)

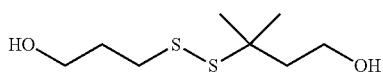

¹H-NMR (CDCl₃, internal standard TMS); δ (ppm):
1.25 (6H, s, (C$\underline{H}$₃)₂C<), 1.78 (4H, t, OH—CH₂—C$\underline{H}$₂—),
2.81 (2H, m, —S—C$\underline{H}$₂—), 3.67 (4H, t, OH—C$\underline{H}$₂—)

Example 4

To a 100 ml three-necked flask equipped with a thermometer, a nitrogen inlet tube, a stirrer and a condenser tube were added 0.500 g of Compound of formula (19), 5.00 g of chloroform, 0.498 g of pyridine and 1.13 g of di(N-succinimidyl) carbonate, and the mixture was stirred in a hot water bath at 40° C. for 24 hours. The reaction solution was filtered with a 5A filter paper and washed three times with 5 g of ion-exchange water. The chloroform layer was dehydrated with magnesium sulfate, filtered, desolvated by an evaporator, and then subjected to nitrogen bubbling in a hot water bath at 70° C. for 2 hours and the disappearance of pyridine odor was confirmed to obtain a compound of formula (22).

(22)

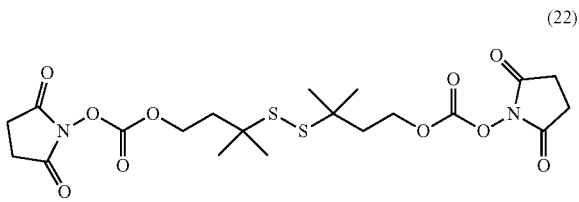 [SMILES: CC(C)(CCOC(=O)ON1C(=O)CCC1=O)SSC(C)(C)CCOC(=O)ON1C(=O)CCC1=O]

¹H-NMR (CDCl₃, internal standard TMS); δ (ppm):
1.25 (12H, s, (C$\underline{H}$₃)₂C<),
1.78 (4H, t, —COO—CH₂—C$\underline{H}$₂—),
2.84 (4H, s, -succinimide),
4.4 (4H, t, —COO—C$\underline{H}$₂—)

Example 5

To a 100 ml three-necked flask equipped with a thermometer, a nitrogen inlet tube, a stirrer and a condenser tube were added 0.500 g of Compound of formula (20), 5.00 g of chloroform, 0.445 g of pyridine and 1.01 g of di(N-succinimidyl) carbonate, and the mixture was stirred in a hot water bath at 40° C. for 2 hours. The reaction solution was washed three times with 5 g of ion-exchange water. The chloroform layer was dehydrated with magnesium sulfate, filtered, desolvated by an evaporator, and then subjected to nitrogen bubbling in a hot water bath at 70° C. for 2 hours and the disappearance of pyridine odor was confirmed to obtain a compound of formula (23).

(23)

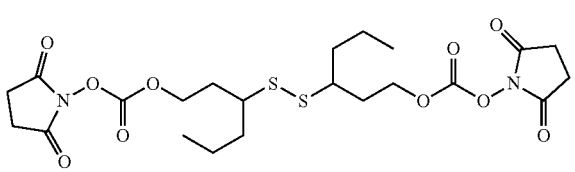

¹H-NMR (CDCl₃, internal standard TMS); δ (ppm):

0.901 (6H, s, C$\underline{H}$₃—CH₂—), 1.35-1.69 (8H, m, CH₃—C$\underline{H}$₂—C$\underline{H}$₂—), 2.05 (4H, m, —COO—CH₂—C$\underline{H}$₂—), 2.81-2.84 (6H, m, -succinimide, —S—C$\underline{H}$<), 4.4 (4H, t, —COO—C$\underline{H}$₂—)

Example 6

To a 100 ml three-necked flask equipped with a thermometer, a nitrogen inlet tube, a stirrer and a condenser tube were added 0.500 g of Compound of formula (21), 5.00 g of chloroform, 056 g of pyridine and 1.27 g of di(N-succinimidyl) carbonate, and the mixture was stirred in a hot water bath at 40° C. for 2 hours. The reaction solution was washed three times with 5 g of ion-exchange water. The chloroform layer was dehydrated with magnesium sulfate, filtered, desolvated by an evaporator, and then subjected to nitrogen bubbling in a hot water bath at 70° C. for 2 hours and the disappearance of pyridine odor was confirmed to obtain a compound of formula (24).

(24)

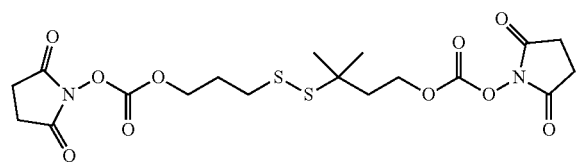

¹H-NMR (CDCl₃, internal standard TMS); δ (ppm):

1.25 (6H, s, (C$\underline{H}$₃)₂C<), 1.78 (4H, t, —COO—CH₂—C$\underline{H}$₂—), 2.81-2.84 (6H, m, -succinimide, —S—C$\underline{H}$₂—), 4.4 (4H, t, —COO—C$\underline{H}$₂—)

Example 7

To a 100 ml three-necked flask equipped with a thermometer, a nitrogen inlet tube and a stirrer were added 50.0 mg of Compound of formula (22), 0.961 g of Compound of formula (25) and 3 g of chloroform, and the mixture was stirred at room temperature for one hour. Then, the mixture was desolvated by an evaporator, after crystallization using 6 g of ethyl acetate and 3 g of hexane were performed three times, the crystals were washed with 10 g of hexane and dried to obtain a compound of formula (26).

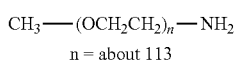
(25)

n = about 113

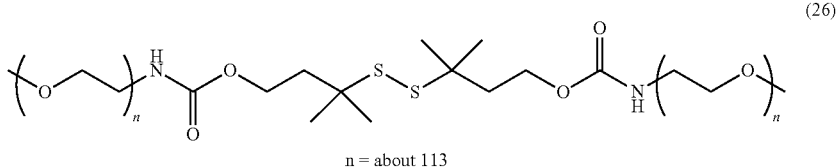
(26)

n = about 113

$^1$H-NMR (CDCl$_3$, internal standard TMS); δ (ppm):
1.25 (12H, s, (C$\underline{H}_3$)$_2$C<), 1.78 (4H, t, —COO—CH$_2$—C$\underline{H}_2$—),
3.38 (6H, s, C$\underline{H}_3$O—), 3.52-4.25 (904H, m, —(OC$\underline{H}_2$C$\underline{H}_2$)$_n$—O—),
4.4 (4H, t, —COO—C$\underline{H}_2$—)

Example 8

To a 100 ml three-necked flask equipped with a thermometer, a nitrogen inlet tube and a stirrer were added 50.0 mg of Compound of formula (23), 0.912 g of Compound of formula (25) and 3 g of chloroform, and the mixture was stirred at room temperature for one hour. Then, the mixture was desolvated by an evaporator, after crystallization using 6 g of ethyl acetate and 3 g of hexane were performed three times, the crystals were washed with 10 g of hexane and dried to obtain a compound of formula (27).

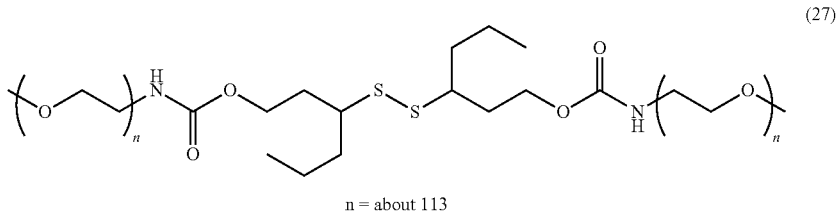
(27)

n = about 113

$^1$H-NMR (CDCl$_3$, internal standard TMS); δ (ppm):
0.901 (6H, s, C$\underline{H}_3$—CH$_2$—),
1.35-1.69 (8H, m, CH$_3$—C$\underline{H}_2$—C$\underline{H}_2$—),
2.05 (4H, m, —COO—C$\underline{H}_2$—C$\underline{H}_2$—),
2.81-2.84 (2H, m, —S—C$\underline{H}$<),
3.38 (6H, s, C$\underline{H}_3$O—),
3.52-4.25 (904H, m, —(OC$\underline{H}_2$C$\underline{H}_2$)$_n$—O—),
4.4 (4H, t, —COO—C$\underline{H}_2$—)

Example 9

To a 100 ml three-necked flask equipped with a thermometer, a nitrogen inlet tube and a stirrer were added 50.0 mg of Compound of formula (24), 1.02 g of Compound of formula (25) and 3 g of chloroform, and the mixture was stirred at room temperature for one hour. Then, the mixture was desolvated by an evaporator, after crystallization using 6 g of ethyl acetate and 3 g of hexane were performed three times, the crystals were washed with 10 g of hexane and dried to obtain a compound of formula (28).

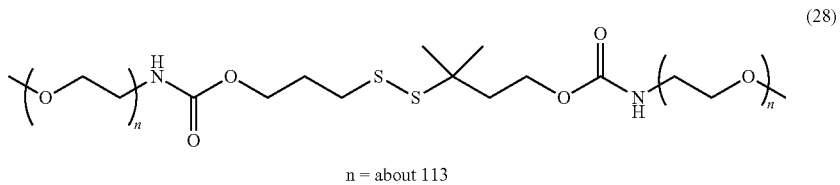
(28)

n = about 113

$^1$H-NMR (CDCl$_3$, internal standard TMS); δ (ppm):

1.25 (6H, s, (C$\underline{H}_3$)$_2$C<), 1.78 (4H, t, —COO—CH$_2$—C$\underline{H}_2$—), 2.81 (2H, m, —S—C$\underline{H}_2$—), 3.38 (6H, s, C$\underline{H}_3$O—), 3.52-4.25 (904H, m, —(OC$\underline{H}_2$C$\underline{H}_2$)$_n$—O—), 4.4 (4H, t, —COO—C$\underline{H}_2$—)

Example 10

To a 100 ml three-necked flask equipped with a thermometer, a nitrogen inlet tube and a stirrer were added 0.0421 g of 2,2'-dithiodipropionic acid, 0.138 g of N-hydroxysuccin-

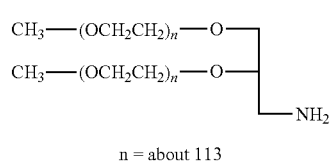

n = about 113 imide, 1.0 g of dehydrated DMF and 0.248 g of dicyclohexylcarbodiimide, and the mixture was stirred at room temperature for one hour. Then, 2.00 g of Compound of formula (25) (raw material of Example 7) was added thereto, and the mixture was further stirred at room temperature for one hour. The mixture was desolvated by an evaporator, after crystallization using 6 g of ethyl acetate and 3 g of hexane were performed three times, the crystals were washed with 10 g of hexane and dried to obtain a compound of formula (29).

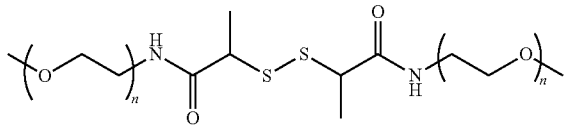

n = about 113

$^1$H-NMR (CDCl$_3$, internal standard TMS); δ (ppm):

0.901 (6H, s, C$\underline{H}_3$—CH$_2$—), 1.35-1.69 (8H, m, CH$_3$—C$\underline{H}_2$—CH$_2$—), 2.05 (4H, m, —COO—CH$_2$—C$\underline{H}_2$—), 2.81-2.84 (2H, m, —S—C$\underline{H}$<), 3.38 (6H, s, C$\underline{H}_3$O—), 3.52-4.25 (904H, m, —(OC$\underline{H}_2$C$\underline{H}_2$)$_n$—O—), 4.4 (2H, d, —COO—C$\underline{H}$(CH$_3$)—)

Example 11

To a 100 ml three-necked flask equipped with a thermometer, a nitrogen inlet tube and a stirrer were added 2.74 g of Compound of formula (23), 1.0 g of Compound of formula (30) and 3 g of chloroform, and the mixture was stirred at room temperature for one hour. Then, the mixture was desolvated by an evaporator, after crystallization using 6 g of ethyl acetate and 3 g of hexane were performed three times, the crystals were washed with 10 g of hexane and dried to obtain a compound of formula (31).

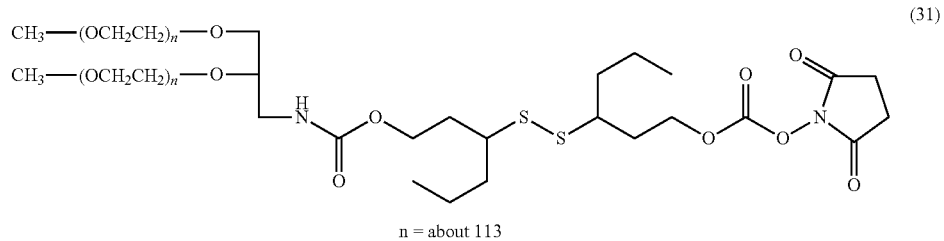

n = about 113

$^1$H-NMR (CDCl$_3$, internal standard TMS); δ (ppm):

0.901 (6H, s, C$\underline{H}_3$—CH$_2$—), 1.35-1.69 (8H, m, CH$_3$—C$\underline{H}_2$—CH$_2$—), 2.05 (4H, m, —COO—CH$_2$—C$\underline{H}_2$—), 2.81-2.84 (4H, m, —S—C$\underline{H}$<, -succinimide), 3.38 (6H, s, C$\underline{H}_3$O—), 3.52-4.25 (904H, m, —(OC$\underline{H}_2$C$\underline{H}_2$)$_n$—O—), 4.4 (4H, t, —COO—C$\underline{H}_2$—)

Example 12

To a 100 ml three-necked flask equipped with a thermometer, a nitrogen inlet tube and a stirrer were added 0.5 g of Compound of formula (31), 0.5 g of Compound of formula (32) and 3 g of chloroform, and the mixture was stirred at room temperature for one hour. Then, the mixture was desolvated by an evaporator, after crystallization using 6 g of ethyl acetate and 3 g of hexane were performed three times, the crystals were washed with 10 g of hexane and dried to obtain a compound of formula (33).

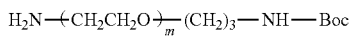  (32)

m = about 226

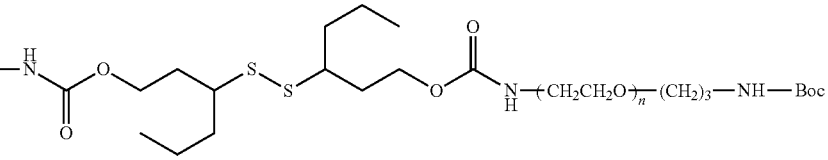  (33)

n = 113, m = 226, $^1$H-NMR (CDCl$_3$, internal standard TMS); δ (ppm):
0.901 (6H, s, CH$_3$—CH$_2$—),
1.35-1.69 (17H, m, CH$_3$—CH$_2$—CH$_2$—, Boc),
2.05 (4H, m, —COO—CH$_2$—CH$_2$—),
2.81-2.84 (2H, m, —S—CH<),
3.38 (6H, s, CH$_3$O—),
3.52-4.25 (1808H, m, —(OCH$_2$CH$_2$)$_n$—O—),
4.4 (4H, t, —COO—CH$_2$—)

Example 13

To a 100 ml three-necked flask equipped with a thermometer, a nitrogen inlet tube and a stirrer were added 0.5 g of Compound of formula (33), 5 g of dichloromethane and 0.24 g of methanesulfonic acid, and the mixture was stirred at room temperature for one hour. Then, the reaction solution was extracted and washed with ion-exchange water, and the chloroform layer was dehydrated with magnesium carbonate, concentrated by an evaporator and after crystallization using 6 g of ethyl acetate and 3 g of hexane were performed three times, the crystals were washed with 10 g of hexane and dried to obtain a compound of formula (34).

Each of the polyethylene glycol derivatives was dissolved in a phosphate buffer saline solution (PBS) containing glutathione at each concentration so that the concentration of each polyethylene glycol derivative was 0.1 mg/mL, set in Slide-A-Lyzer G2 dialysis cassette (3 mL, 2 k) as a dialysis membrane, and dialysis was performed at 37° C. in the phosphate buffer saline solution (PBS) containing glutathione at each concentration. The solution of polyethylene glycol derivative was sampled at each time, filtered with a syringe filter (cellulose acetate, 0.45 μm), and subjected to HPLC analysis under the conditions shown below.

Analysis Conditions:
Column: Ultrahydrogel 500+250 (7.8×300 mm)
Temperature: 30° C.
Flow rate: 0.5 mL/min
Injection amount: 100 μL
Detector: RI
Mobile phase (1): 100 mM acetic acid buffer+0.02% NaN$_3$ (pH 5.2)
Mobile phase (2): H$_2$O/acetonitrile=8/2
Mobile phase (3): PBS/acetonitrile=8/2

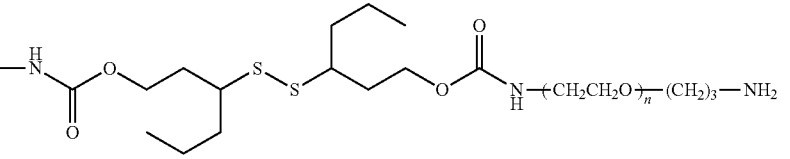  (34)

n = 113; m = 226

$^1$H-NMR (CDCl$_3$, internal standard TMS); δ (ppm):
0.901 (6H, s, CH$_3$—CH$_2$—), 1.35-1.69 (8H, m, CH$_3$—CH$_2$—CH$_2$—),
2.05 (4H, m, —COO—CH$_2$—CH$_2$—), 2.65 (2H, m, —CH$_2$—NH$_2$),
2.81-2.84 (2H, m, —S—CH<), 3.38 (6H, s, CH$_3$O—),
3.52-4.25 (1808H, m, —(OCH$_2$CH$_2$)$_n$—O—),
4.4 (4H, t, —COO—CH$_2$—)

Example 14

Using the compounds synthesized in Comparative Examples 1 and 2 and Examples 7 to 10 and 13, degradation tests at 37° C. and glutathione concentration of 10 μM and glutathione concentration of 10 mM, respectively, were performed. The conditions of the test are shown below.

As to the compounds synthesized in Comparative Examples 1 and 2 and Examples 7 to 10, when a peak area of the undivided polyethylene glycol derivative (molecular weight: about 10,000) was taken as A2 and a peak area of the polyethylene glycol derivative divided by the degradation of the linker (molecular weight: about 5,000) was taken as A1, a remaining rate was calculated according to the formula shown below.

Remaining rate (%)=[$A^2/(A^1+A^2)$]×100

As to the compounds synthesized in Example 13, when a peak area of the undivided polyethylene glycol derivative (molecular weight: about 20,000) was taken as A2 and a peak area of the polyethylene glycol derivative divided by the degradation of the linker (molecular weight: about 10,000) was taken as A1, a remaining rate was calculated according to the formula shown below.

Remaining rate (%)=[$A^2/(A^1+A^2)$]×100

Figure 2:
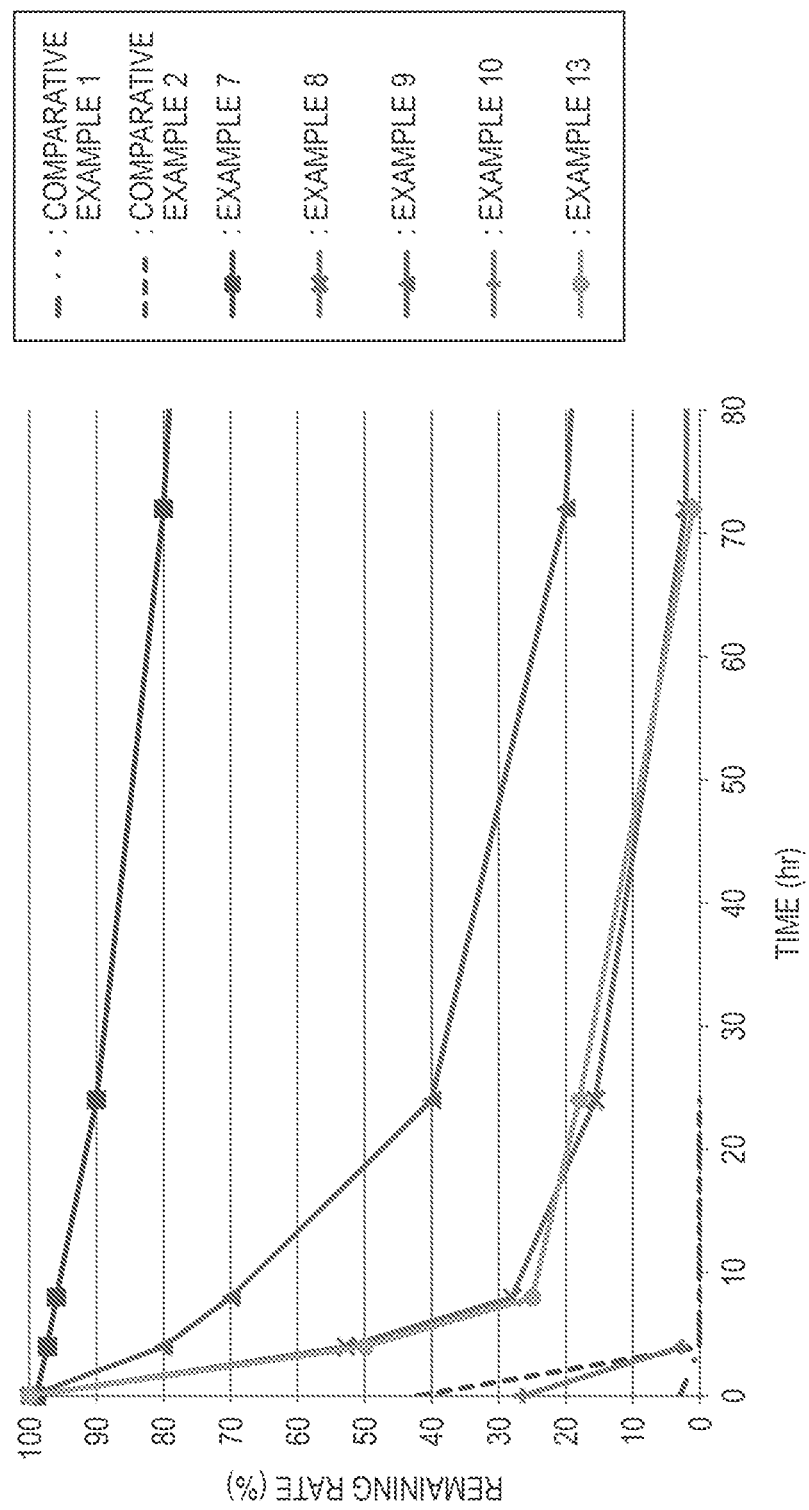
FIG. 2 shows results of the degradability test at glutathione concentration of 10 mM.

The results at the glutathione concentration of 10 μM were shown in FIG. 1 and the results at the glutathione concentration of 10 mM were shown in FIG. 2.

As described above, according to the invention, the degradable polyethylene glycol derivative in which polyethylene glycol chains are linked by a disulfide linker capable of accurately controlling the degradation rate under different reductive environments in the living body, and whose division rate into a polyethylene glycol chain of low molecular weight in the living body is able to be accurately controlled can be provided.

Example 15

To a 100 ml three-necked flask equipped with a thermometer, a nitrogen inlet tube and a stirrer were added 715 mg of Compound of formula (23), 100 mg of m-dPEG8-amine and 5 g of chloroform, and the mixture was stirred at room temperature for one hour. Then, the mixture was desolvated by an evaporator, and purified by silica gel column chromatography to obtain a compound of formula (35).

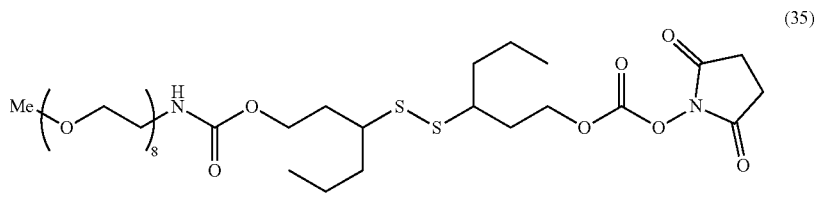

(35)

$^1$H-NMR (CDCl$_3$, internal standard TMS); δ (ppm):
0.901 (6H, s, C$\underline{H}_3$—CH$_2$—), 1.35-1.69 (8H, m, CH$_3$—C$\underline{H}_2$—CH$_2$—),
2.05 (4H, m, —COO—C$\underline{H}_2$—CH$_2$—),
2.81-2.84 (6H, m, —S—C$\underline{H}$<, -succinimide),
3.38 (3H, s, C$\underline{H}_3$O—),
3.40-3.43 (2H, m, —O—CH$_2$—C$\underline{H}_2$—NH—),
3.60-3.70 (28H, m, —(OC$\underline{H}_2$C$\underline{H}_2$)$_7$—),
3.78 (2H, t, —O—C$\underline{H}_2$—CH$_2$—NH—),
4.4 (4H, t, —COO—C$\underline{H}_2$—)

Example 16

To a 100 ml three-necked flask equipped with a thermometer, a nitrogen inlet tube and a stirrer were added 100 mg of Compound of formula (35), 66 mg of Amino-dPEG8-acid and 5 g of chloroform, and the mixture was stirred at room temperature for one hour. Then, the reaction solution was washed three times with 5 g of an aqueous 1 mol/L hydrochloric acid solution. The chloroform layer was dehydrated with magnesium sulfate, filtered, desolvated by an evaporator, and purified by silica gel column chromatography to obtain a compound of formula (36).

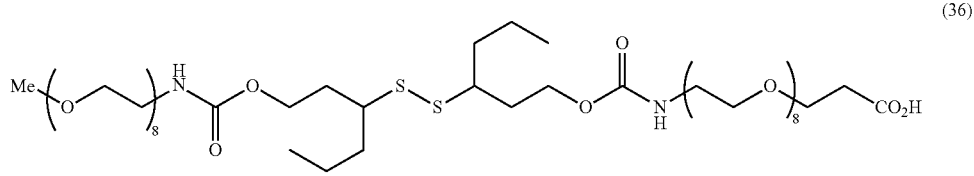

(36)

$^1$H-NMR (CDCl$_3$, internal standard TMS); δ (ppm):
0.901 (6H, s, C$\underline{H}_3$—CH$_2$—), 1.35-1.69 (8H, m, CH$_3$—C$\underline{H}_2$—C$\underline{H}_2$—),
2.05 (4H, m, —COO—CH$_2$—C$\underline{H}_2$—),
2.61 (2H, t, —O—CH$_2$—C$\underline{H}_2$—CO$_2$H),
2.81 (2H, m, —S—CH<),
3.38 (3H, s, C$\underline{H}_3$O—),
3.40-3.43 (4H, m, —O—CH$_2$—C$\underline{H}_2$—NH—),
3.60-3.70 (56H, m, —(OC$\underline{H}_2$C$\underline{H}_2$)$_7$—),
3.78 (4H, t, —O—C$\underline{H}_2$—CH$_2$—NH—),
3.85 (2H, t, —O—C$\underline{H}_2$—CH$_2$—CO$_2$H),
4.4 (4H, t, —COO—C$\underline{H}_2$)

While the invention has been described in detail and with reference to specific embodiments thereof, it will be apparent to those skilled in the art that various changes and modifications can be made therein without departing from the spirit and scope of the invention.

This application is based on Japanese patent application filed on Mar. 30, 2017 (Japanese Patent Application No. 2017-066942), and the whole contents thereof are incorporated herein by reference. Also, all the references cited herein are incorporated as a whole.

The invention claimed is:

1. A degradable polyethylene glycol derivative represented by formula (1):

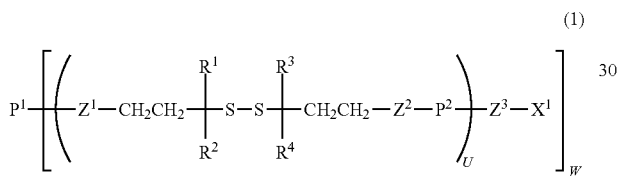
(1)

wherein, in the formula (1), R$^1$, R$^2$, R$^3$, and R$^4$ represent each independently a hydrogen atom or a hydrocarbon group having from 1 to 6 carbon atoms, and at least one of R$^1$, R$^2$, R$^3$, and R$^4$ is the hydrocarbon group; P$^1$ is a straight-chain or branched polyethylene glycol chain having a number of ethylene glycol units of 3 or more; P$^2$ is a straight-chain polyethylene glycol chain having a number of ethylene glycol units of 3 or more; z is an integer of 1 to 8; u is an integer of 1 to 10; X$^1$ is a chemically reactive functional group; and Z$^1$, Z$^2$, and Z$^3$ are each independently a selected divalent spacer.

2. The degradable polyethylene glycol derivative as claimed in claim 1, wherein a sum of number of carbon atoms in R$^1$, R$^2$, R$^3$ and R$^4$ is from 1 to 6.

3. The degradable polyethylene glycol derivative as claimed in claim 1, wherein w is 1.

4. The degradable polyethylene glycol derivative as claimed in claim 3, wherein P$^1$ is a straight-chain polyethylene glycol chain having a hydrocarbon group or a chemically reactive functional group at a terminal thereof.

5. The degradable polyethylene glycol derivative as claimed in claim 4, wherein P$^1$ is represented by the following formula (2):

(2)

wherein, in the formula (2), X$^2$ is a chemically reactive functional group different from X$^1$ or a methoxy group; Z$^4$ is a divalent spacer; and n is an integer of 3 to 2,000.

6. The degradable polyethylene glycol derivative as claimed in claim 1, wherein w is from 2 to 8.

7. The degradable polyethylene glycol derivative as claimed in claim 4, wherein P$^1$ is represented by formula (3):

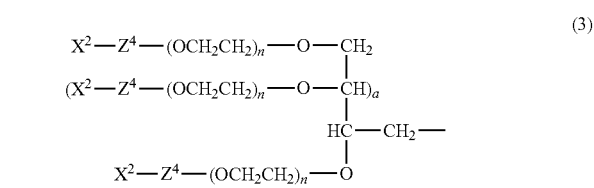
(3)

wherein in the formula (3), X$^2$ is a chemically reactive functional group different from X$^1$ or a methoxy group; Z$^4$ is a divalent spacer; n is an integer of 3 to 1,000; and a is 0 or 2.

8. The degradable polyethylene glycol derivative as claimed in claim 6, wherein P$^1$ is represented by formula (4):

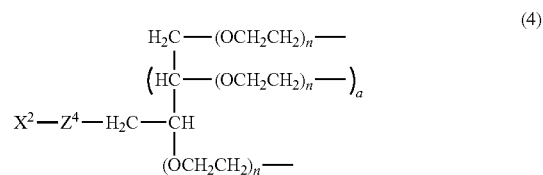
(4)

wherein in the formula (4), X$^2$ is a chemically reactive functional group different from X$^1$ or a methoxy group; Z$^4$ is a divalent spacer; n is an integer of 3 to 1,000; and a is 0 or 2.

9. The degradable polyethylene glycol derivative as claimed in claim 6, wherein P$^1$ is selected from the group consisting of formula (r), formula (s), formula (t), formula (u) and formula (v):

(r)

(s)

(t)

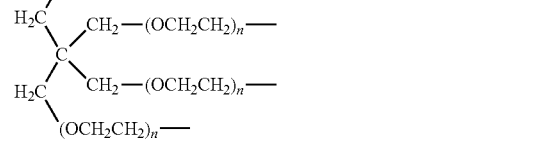

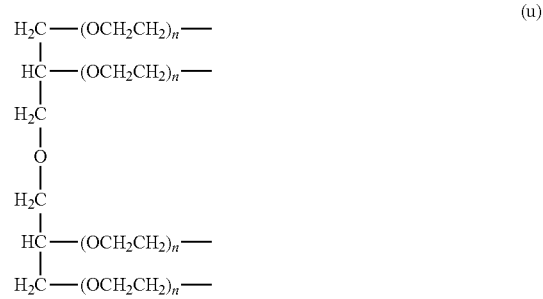
(u)

-continued

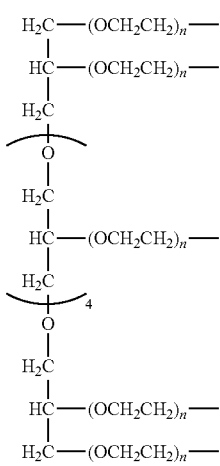

(v)

wherein, in the formula (r), the formula (s), the formula (t), the formula (u) and the formula (v), n is an integer of 3 to 2,000; and w is 2 in a case where $P^1$ is represented by the formula (r), w is 3 in a case where $P^1$ is represented by the formula (s), w is 4 in a case where $P^1$ is represented by the formula (t), w is 4 in a case where $P^1$ is represented by the formula (u), and w is 8 in a case where $P^1$ is represented by the formula (v).

10. The degradable polyethylene glycol derivative as claimed in claim 1, wherein $P^2$ is represented by formula (5):

(5)

wherein, in the formula (5), m is an integer of 3 to 2,000.

11. The degradable polyethylene glycol derivative as claimed in claim 1, wherein $X^1$ is selected from the group consisting of an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group and an azide group.

12. The degradable polyethylene glycol derivative as claimed in claim 1, wherein $Z^1$, $Z^2$ and $Z^3$ are each independently an ether bond, an ester bond, a carbonate bond, a urethane bond, an amide bond, a secondary amino group, an alkylene group containing any of these bonds and group, a single bond or an alkylene group.

13. The degradable polyethylene glycol derivative as claimed in claim 5, wherein $X^2$ is selected from the group consisting of an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group, a methoxy group and an azide group.

14. The degradable polyethylene glycol derivative as claimed in claim 2, wherein w is 1.

15. The degradable polyethylene glycol derivative as claimed in claim 14, wherein $P^1$ is a straight-chain polyethylene glycol chain having a hydrocarbon group or a chemically reactive functional group at a terminal thereof.

16. The degradable polyethylene glycol derivative as claimed in claim 15, wherein $P^1$ is represented by the following formula (2):

(2)

wherein, in the formula (2), $X^2$ is a chemically reactive functional group different from $X^1$ or a methoxy group; $Z^4$ is a divalent spacer; and n is an integer of 3 to 2,000.

17. The degradable polyethylene glycol derivative as claimed in claim 2, wherein w is from 2 to 8.

18. The degradable polyethylene glycol derivative as claimed in claim 15, wherein $P^1$ is represented by formula (3):

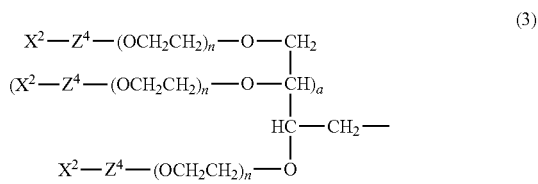

(3)

wherein in the formula (3), $X^2$ is a chemically reactive functional group different from $X^1$ or a methoxy group; $Z^4$ is a divalent spacer; n is an integer of 3 to 1,000; and a is 0 or 2.

19. The degradable polyethylene glycol derivative as claimed in claim 17, wherein $P^1$ is represented by formula (4):

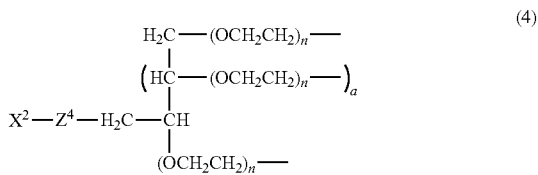

(4)

wherein in the formula (4), $X^2$ is a chemically reactive functional group different from $X^1$ or a methoxy group; $Z^4$ is a divalent spacer; n is an integer of 3 to 1,000; and a is 0 or 2.

20. The degradable polyethylene glycol derivative as claimed in claim 17, wherein $P^1$ is selected from the group consisting of formula (r), formula (s), formula (t), formula (u) and formula (v):

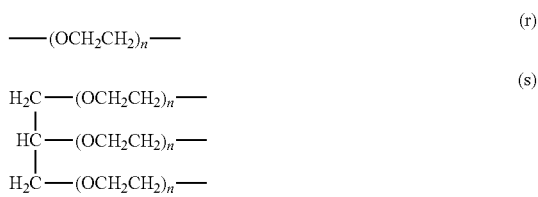

(r)

(s)

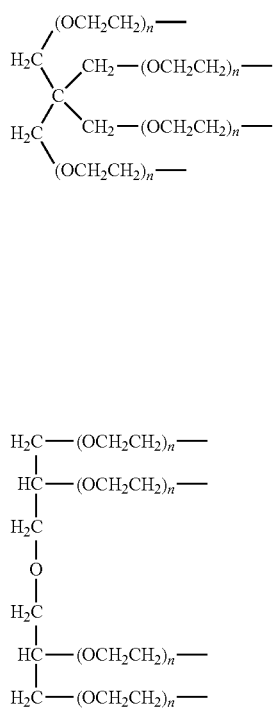
(r)

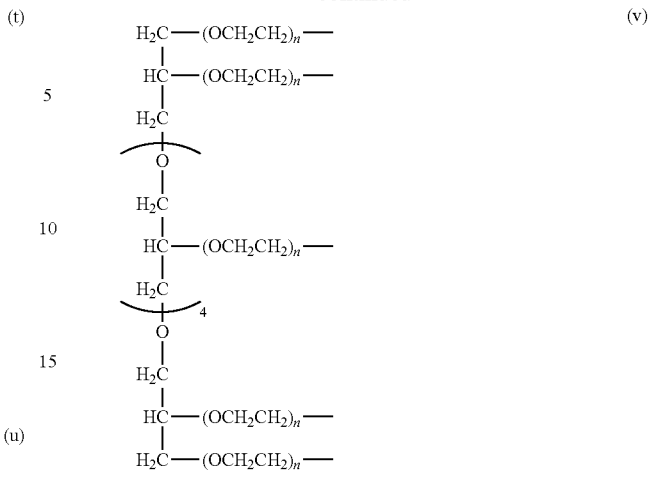
(t)

(u)

(v)

wherein, in the formula (r), the formula (s), the formula (t), the formula (u) and the formula (v), n is an integer of 3 to 2,000; and w is 2 in a case where $P^1$ is represented by the formula (r), w is 3 in a case where $P^1$ is represented by the formula (s), w is 4 in a case where $P^1$ is represented by the formula (t), w is 4 in a case where $P^1$ is represented by the formula (u), and w is 8 in a case where $P^1$ is represented by the formula (v).

* * * * *